(12) United States Patent
Kobayashi et al.

(10) Patent No.: US 8,968,127 B2
(45) Date of Patent: *Mar. 3, 2015

(54) TENSIONER

(75) Inventors: Takao Kobayashi, Nagano (JP); Tanehira Amano, Nagano (JP); Ikuomi Takahashi, Nagano (JP); Takahiro Ito, Nagano (JP)

(73) Assignee: NHK Spring Co., Ltd., Nagano (JP)

( * ) Notice: Subject to any disclaimer, the term of this patent is extended or adjusted under 35 U.S.C. 154(b) by 853 days.

This patent is subject to a terminal disclaimer.

(21) Appl. No.: 13/121,261

(22) PCT Filed: Sep. 17, 2009

(86) PCT No.: PCT/JP2009/066215
§ 371 (c)(1),
(2), (4) Date: Jun. 10, 2011

(87) PCT Pub. No.: WO2010/038620
PCT Pub. Date: Apr. 8, 2010

(65) Prior Publication Data
US 2011/0251001 A1    Oct. 13, 2011

(30) Foreign Application Priority Data
Oct. 1, 2008 (JP) .................................. 2008-255906

(51) Int. Cl.
*F16H 7/08* (2006.01)
(52) U.S. Cl.
CPC ...... *F16H 7/0848* (2013.01); *F16H 2007/0806* (2013.01); *F16H 2007/0812* (2013.01); *F16H 2007/0853* (2013.01)
USPC ......................................... 474/109; 474/111
(58) Field of Classification Search
CPC ..................... F16H 2007/0853; F16H 7/0848
USPC .................................... 474/109, 110, 111, 101
See application file for complete search history.

(56) References Cited

U.S. PATENT DOCUMENTS 5,860,881 A * 1/1999 Tada .............................. 474/110

FOREIGN PATENT DOCUMENTS

| EP | 0 869 298 | 10/1998 |
|----|-----------|---------|
| JP | 2002 139110 | 5/2002 |

(Continued)

*Primary Examiner* — William E Dondero
*Assistant Examiner* — Diem Tran
(74) *Attorney, Agent, or Firm* — Greer, Burns & Crain, Ltd.

(57) ABSTRACT

A tensioner having a simplified structure, using engaging teeth having increased strength and reduced backlash, constructed from a reduced number of parts, reduced in cost, and having increased design freedom. A tensioner comprises: a tubular member (1) having engaging teeth (1b) formed thereon; one or more engaging elements (2) having formed thereon engaging teeth (2a) engaging with the engaging teeth (1b); and a shaft member (3) provided inside the tubular member (1) and having an engaging-element receiving section (3c) or an engaging-element supporting section which receives the engaging elements (2) of the tubular member (1). Either the tubular member (1) or the shaft member (3) functions as an advancing member which is moved by urging force in an advancing and retracting manner. The tensioner is provided with a ratchet mechanism which, when the engaging elements (2) move in a diameter reducing direction and move over the engaging teeth of the tubular member (1), allows the advancing member to advance forward, and when the engaging elements (2) move in a diameter expanding direction and engage with the engaging teeth of the tubular member (1), prevents the advancing member to retract.

6 Claims, 26 Drawing Sheets

(56) References Cited

FOREIGN PATENT DOCUMENTS

| | | |
|---|---|---|
| JP | 2007-092831 | 4/2007 |
| JP | 2007-100753 | 4/2007 |
| SU | 55-147309 | 10/1980 |
| SU | 61-69556 | 5/1986 |

* cited by examiner (a)

(b)

(c)

(a)

(b)

(c)

(a)

(b)

(c)

(a)

(b)

(c)

(a)

(b)

(a)

(b)

(c)

(a)

(b)

(c)

(a)

(b)

(c)

(a)

(b)

(a) 
Excessive load (under high-temperature operation)

(b) 
Proper load (under normal-temperature operation)

(c) 
Light load (under cold-temperature operation)

(a)

(b)

(c)

(a)

(b)

(a)

(b)

(a)

(b)

(a)

(b)

(c)

(a)

(b)

(c)

(a)

(b)

(a)

(b)

(a)

(b)

TENSIONER

FIELD OF THE INVENTION

The present invention relates to a tensioner that keeps constant the tension of an endless belt or endless chain.

BACKGROUND OF THE INVENTION

The tensioner presses, with a predetermined force, a timing chain or a timing belt that is used, for example, for the engine of an automobile, and maintains the tension constant so as to prevent the chain or belt from becoming elongated or slack.

FIG. 23 shows the condition when a tensioner 100 is mounted to an engine body 200 of an automobile. A pair of cam sprockets 210 and a crank sprocket 220 are arranged inside the engine body 200, and a timing chain 230 is hooked in an endless manner over the sprockets 210 and 220. A chain guide 240 is swingably arranged on the movement path of the timing chain 230, and the timing chain 230 slides on the chain guide 240. A mounting face 250 is formed on the engine body 200, and the tensioner 100 is inserted through a mounting hole 260 that is on the mounting face 250 and the tensioner 100 is fixed to the mounting face 250 by bolts 270. Also, lubricating oil (not shown) is filled inside the engine body 200.

A conventional tensioner includes
  a columnar drive member that is movable toward a moving chain,
  a case that includes a slide hole through which the drive member is inserted concentrically with the drive member in such a way that the drive member can move freely,
  a propelling spring that presses the drive member against the case in the driving direction,
  a holder member that is fitted with the drive member in the concave part that is coaxially formed on the tip opening side of the slide hole, is displaced in the axial direction of the drive member, and is provided concentrically with the concave part,
  a holder spring that presses the holder member in the driving direction of the drive member,
  multiple locking pieces that slide on the inclined cam face and are meshed with multiple locking teeth formed on the outside of the drive member,
  a cam-introducing ring that is fitted to the drive member in the slide hole and prevents the multiple locking pieces from becoming detached from the multiple locking teeth, and
  an enclosing plate that inserts the drive member and movably encloses the holder spring, the holder member, the locking pieces, and the cam-introducing ring—all of which are sequentially arranged in the concave part of the slide hole—in such a way that the holder spring, the holder member, the locking pieces, and the cam-introducing ring can move freely.

In this tensioner, if the chain becomes elongated during the operation of the engine, the drive member sequentially moves forward one tooth at a time, thereby maintaining proper chain tension (for example, see Patent Document 1).

In the tensioner described above, the drive member is pressed forward by the propelling spring, and the diameter of the locking pieces is thereby enlarged, as a result of which the locking pieces can move forward while riding over the locking teeth of the drive member. Also, when the drive member moves backward, the locking pieces are pressed against the inclined cam face, and the diameter of the locking pieces is thereby reduced. The locking pieces then mesh with the locking teeth of the drive member, so that the locking pieces are prevented from moving backwards, and are locked in that condition.

When mounted to the engine body, the drive member moves forward to a position whereby proper chain tension is maintained, and the drive member is prevented from returning excessively from that forward position while receiving vibrations from the chain guide. If an excessive load is applied, the holder member moves backward, and the holder spring is flexed so as to keep proper chain tension. Also, if the chain has become elongated due to a long period of use, the drive member appropriately moves the chain guide forward, so that proper chain tension is maintained.

Patent Document 1: Japanese Patent No. 3717473

FIG. 24(a) is a vertical cross-sectional view of a conventional tensioner that has a constitution similar to the tensioner described in the above-specified Patent Document 1. FIG. 24(b) is a side view of that tensioner. FIG. 25(a) shows how the drive member of the tensioner in FIG. 24 is fully locked with the locking pieces. FIG. 25(b) is a cross-sectional view along the line D-D of FIG. 25(a). FIG. 26(a) shows how the diameter of the locking pieces is enlarged when the drive member of FIG. 25 moves forward, and FIG. 26(b) is a cross-sectional view along the line E-E of FIG. 26(a).

In these drawings, number 310 is a drive member; 320 is a locking piece; 330 is a holder member; 340 is a propelling spring; 350 is a pressing spring that presses the locking pieces 320 against the inclined cam face 330a of the holder member 330 so as mesh with the drive member 310, so that the diameter of the locking pieces 320 is reduced; 360 is a holder spring; and 370 is a case.

DISCLOSURE OF THE INVENTION

Problem to be Solved by the Invention

In a conventional tensioner, a drive member 310, locking pieces 320, a holder member 330, and a case 370 are sequentially arranged concentrically from the shaft's center. Normally, the outside diameter of the case 370 is set according to the diameter of the mounting hole 260 of the engine body 200 (FIG. 23), and therefore the outside diameter of the locking part 310b of the drive member 310 tends to be small due to the arrangement of the constituent parts. In a high-output engine or the like, the magnitude of vibrations from the cam chain is large. To endure such a load, the outside diameter of the drive member 310 needs to be comparatively large, so that the locking area between the drive member 310 and the locking pieces 320 is increased. However, if the outside diameter of the drive member 310 is made large, the outside diameter of the case 370 also must be large, and the case cannot be inserted by using a predetermined mounting hole 260, which leads to the problem that design freedom is small.

When the drive member 310 moves forward and when the locking pieces 320 climb over the nearest subsequent locking tooth and then engage with the next locking tooth, the diameter of the locking pieces 320 becomes enlarged along the inclined cam face 330a of the holder member 330. When the height of the locking teeth is h and the amount of enlargement of the diameter of the locking pieces 320, whose diameter must be enlarged for the locking pieces 320 to climb over the height h of the locking teeth, is c, the inside of the holder member 330 must have a gap C that is significantly larger than c, so that the locking pieces 320 can without fail climb over the teeth, even if the product dimensions vary in precision (FIGS. 25 and 26). The outside diameter of the case 370 becomes large due to this gap C. If two locking pieces 320 are arranged opposed to each other, a larger gap 2C is required.

Also, the locking pieces 320 have a "no-back" design, and therefore they cannot be expected to return in the drive member's backward-movement direction. Due to thermal expansion of the engine body (engine block) 200 along with thermal change inside the engine (FIG. 23), the distance between the crank shaft and the cam shaft, around which a timing chain 230 is hooked, changes. The timing chain 230 loosens at low temperature and tightens at high temperature. And because the timing chain 230 loosens at low temperature, when the drive member 310 is in a position where the locking pieces 320 have climbed over one locking tooth and are almost engaged with the next locking tooth, backlash causes mechanical-contact noises, mainly rattling noises, to occur. In contrast, if the engine temperature is high, the timing chain 230 tightens and presses the drive member 310 backwards. At that time, the locking pieces 320 are completely engaged with the drive member 310. Even if the drive member 310 is further pressed by the timing chain 230, the drive member 310 cannot move backward, and there results excessive tension on the timing chain 230, which becomes subject to overload. Under this condition, the contact noises are reduced by reducing the pitch of the locking teeth, and an excessive load is prevented by shrinking the holder spring 360, which is installed on the back face of the holder member 330 to prevent excessive loads. However, if the pitch of the locking teeth is too small, the height h of the locking teeth becomes small and the strength of the locking teeth decreases, limiting design freedom.

Furthermore, the conventional tensioner has problems in that it requires a case 370 for accommodating the above-mentioned drive member 310, the locking pieces 320, the holder member 330, the propelling spring 340, the pressing spring 350, and the holder spring 360, and it has a complicated structure.

The present invention has been made to solve the above-mentioned problems, and the objectives of the present invention are to provide a tensioner that has a simplified structure, that can increase the strength of the locking teeth, that can reduce backlash, that can reduce the number of parts and cost of the tensioner, and that has a large degree of design freedom.

Means for Solving the Problems

To achieve the above-mentioned objectives, described in claim 1 is a tensioner that includes
  a tubular member on which multiple locking teeth are formed,
  one or more locking pieces on which are formed locking teeth that engage with said tubular member's locking teeth, and
  a shaft that is arranged inside the tubular member and that has a locking-piece receiver or a locking-piece-supporter for receiving the locking pieces that are engaged with the tubular member,
and wherein said tensioner
  either said tubular member or said shaft functions as a drive member that moves freely due to a biasing force, and
  there is provided a ratchet mechanism in which said locking pieces move in said locking pieces' diameter-reduced direction so that the locking pieces climb over the locking teeth of said tubular member so that said moving member can move in the direction that reduces the diameter of the locking pieces, with said rachet mechanism preventing the backward movement of said moving member, and said movement prevention resulting because said locking pieces move in the direction that enlarges the diameter of the locking pieces 2, so as to engage with the locking teeth of said tubular member.

A conventional tensioner requires two movement-accommodation spaces 2C toward the outer periphery of its inner space so that a pair of locking pieces can climb over the locking teeth when the drive member moves forward (FIGS. 25, 26). However, in the invention described in claim 1, the locking pieces move in the direction that reduces their diameter, enabling them to climb over the locking teeth, as a result of which it is not necessary to have a gap C towards the outer periphery of the tensioner's inner space. Furthermore, there is no need for a holder member 330 (FIG. 24) as a conventional tensioner requires. Therefore, if the outside diameter of a case body is the same as that of a conventional tensioner, the radial dimension of the holder member 330 can be used to increase the diameter of the tubular member. As the diameter of the tubular member is increased, its rigidity against a lateral load increases. Also, when the outside diameter of the tubular member is made to be the same as that of a conventional tensioner, the rigidity of the locking pieces and the locking teeth on the inner face of the tubular member can be set to endure a large load. When the inside diameter of the tubular member is the same as the outside diameter of the drive member of a conventional tensioner, the entire tensioner can be made thin and compact while maintaining the rigidity of the locking pieces and the locking teeth on the inner face of the tubular member.

The invention of claim 2 is a tensioner according to claim 1, and wherein said ratchet mechanism is formed on said locking-piece receiver, and said claim 2 tensioner includes (1) an inclined cam face formed so as to be enlarged in the direction in which said locking pieces engage with the locking teeth of said tubular member, and (2) a pressing spring that presses said locking pieces towards the inclined cam face of the shaft and biases said locking pieces in their diameter-enlarged direction.

In the invention of claim 2, because the ratchet mechanism has a simple structure that includes the inclined cam face of the shaft and the pressing spring, the diameter of the locking pieces becomes enlarged so as both to engage with the locking teeth of the tubular member and to restrain the backward movement of the moving member. Also, the pressing spring presses the locking pieces toward the inclined cam face of the shaft in the direction that enlarges the diameter of the locking pieces and that allows the locking pieces and the locking teeth of the tubular member to be tightly engaged together so that there is no play between them and no rattling.

The invention described in claim 3 is a tensioner according to claim 1, and wherein the ratchet mechanism comprises
  a locking-piece-accommodation groove that is formed on the locking-piece supporter and that accommodates the locking pieces,
  a support shaft that swingably pivots, in the tensioner's radial direction, the locking pieces inside the locking-piece-accommodation groove, and
  a pressing spring that presses the locking pieces in the direction that enlarges their diameter.

In the invention described in claim 3, because the ratchet mechanism has a simple structure in which the locking pieces are pivoted swingably in the tensioner's radial direction by the support shaft and the pressing spring inside the locking-piece-accommodation groove of the shaft, the diameter of the locking pieces becomes enlarged and the locking pieces become engaged with the locking teeth of the tubular member, so that backward movement of the drive member is prevented. Also, the pressing spring presses the locking pieces against the inclined cam face of the shaft in the direction that enlarges the diameter of the locking pieces, and therefore the locking pieces and the locking teeth of the tubular member can be tightly engaged together so that there is no play between them and no rattling.

The invention described in claim 4 is a tensioner according to claim 1, and wherein the locking teeth of the tubular member and the locking pieces are spur teeth, being single-threaded or multi-threaded teeth having a lead of 0 and formed into a groove in a direction orthogonal to the axial direction of said tubular member.

In the invention of claim 4, because the locking teeth of the tubular member and the locking pieces are spur teeth with a lead of 0, there can be provided a ratchet mechanism that can be manufactured easily and that is able to be engaged or disengaged without relative rotation between the locking pieces and the tubular member. If the locking teeth are threaded teeth, a specified strength can be secured. If the locking teeth are single-threaded teeth whose pitch and lead are the same, it is possible to use a thread-cutting (threading) method that is generally used in creating a general/normal screw, in manufacturing such single-threaded teeth whose pitch and lead are the same, and it is possible to make the pitch small so as to prevent play between the locking teeth of the locking pieces and the tubular member. If the locking teeth are multi-threaded teeth for which the numerical product obtained by multiplying the value of the pitch by the number of threads is the value of the lead, it is possible to further prevent play between the both locking teeth of the locking pieces and the tubular member by making the pitch even smaller.

The invention described in claim 5 is a tensioner according to claim 1, and wherein the tubular member has a radial gap that allows the outer face of the shaft to be arranged on the inner face of the tubular member in such a way that the shaft and the tubular member are axially movable against each other.

In the invention described in claim 5, because the radial gap between the inner face of the tubular member and the outer face of the shaft is small, the shaft is supported by the tubular member along their longitudinal direction in such a way that the shaft can move forward or backward, and therefore it is possible to increase the strength of the tensioner against an eccentric input (lateral load). Also, if hydraulic pressure is to be applied inside the tubular member, the dimension of the gap is set to be appropriate for sealing, so that a function for sealing the tubular member is provided. Furthermore, if there is a need to increase the sealing property, a seal is incorporated between the inner face of the tubular member and the outer face of the shaft so as to ensure the hydraulic sealing.

The invention described in claim 6 is a tensioner according to claim 1, and wherein there is a hydraulic source that applies hydraulic pressure in the driving direction of the drive member.

In the invention described in claim 6, because the driving force of the drive member is increased by applying the hydraulic pressure from the hydraulic source in the driving direction of the drive member, it is possible to use a small-size propelling spring whose compression force is set low. Also, because of the viscosity of the hydraulic oil, a damping effect and a lubricating effect due to the viscosity resistance of the hydraulic oil are provided in the operation of movable members such as the drive member and the locking pieces. Therefore the amplitude of the drive member's forward or backward movement is stably restrained, the abrasion of the movable members is prevented, and the durability of the movable members is improved.

Effects of the Invention

In the present invention, the shaft is accommodated in the tubular member, and the shaft, the locking pieces, and the tubular member are sequentially arranged from the tensioner's axial center toward the outside. Because the locking pieces move in the direction that reduces their diameter and enables them to climb over the locking teeth, there is no need to form a gap C inside the tensioner or to provide a holder member, and therefore the diameter of the tubular member can be set as desired. Accordingly, even when the outside diameter of the tubular member is the same as that of a conventional tensioner, it is possible to increase the tubular member's diameter so as to increase the tubular member's rigidity against a lateral load and to make the locking pieces and the locking teeth on the inner face of the tubular member strong enough to endure a large load. Also, if the inside diameter of the tubular member is the same as the outside diameter of the drive member of a conventional tensioner so that the strength of the locking pieces is the same as that of the locking teeth of the tubular member, the entire tensioner can be made thinner and more compact than a conventional tensioner.

Accordingly, the present invention can provide a tensioner that has a simplified structure, increases the strength of the locking teeth, reduces backlash, reduces the number of parts and cost of the tensioner, and has a large degree of design freedom.

BEST MODES FOR CARRYING OUT THE INVENTION

The tensioner of the present invention will now be explained in detail with reference to the drawings showing the embodiments.

Embodiment 1

FIG. 1(a) is a vertical cross-sectional view showing the tensioner of Embodiment 1 of the present invention, FIG. 1(b) is a right-side view of the tensioner, and FIG. 1(c) is a cross-sectional view along the line A-A of FIG. 1(a). FIG. 2 is an exploded perspective view of a main part (ratchet mechanism part) at the top of the tensioner of Embodiment 1. FIG. 3(a) is a side view (partial vertical-cross-sectional view) of the shaft of Embodiment 1, and FIGS. 3(b) and 3(c) are a plane view and a right-side view, respectively, of said shaft. FIG. 4(a) is a side view (upper-half vertical-cross-sectional view) of the locking pieces of Embodiment 1, and FIGS. 4(b) and 4(c) are a left-side view and a right-side view, respectively, of said locking pieces. FIG. 5(a) is a side view of the anti-rotation plate of Embodiment 1, and FIGS. 5(b) and 5(c) are a plane view and a left view, respectively, of said anti-rotation plate.

The tensioner in First Embodiment 1 schematically includes
- a tubular member 1 that is a drive member on whose hollow inner surface multiple locking teeth 1b are formed,
- a pair of split-nut-like locking pieces 2 that are engaged with locking teeth 1b on the inner surface of the tubular member 1,
- a shaft 3 that is freely fitted in the hollow of the tubular member 1 and that has a locking-piece receiver—for receiving the locking pieces 2—on its top,
- a propelling spring 4 that presses the tubular member 1 in the driving direction,
- a pressing spring 5 that presses the locking pieces 2 in the direction of the locking-piece receiver of the shaft 3, a holder spring 6 that presses the shaft 3 in the driving direction of the tubular member 1, and a hollow case 7 that has a bottom and in which the tubular member 1 is fitted and inserted in such a way that the tubular member 1 is movable forward or backward.

The case 7 is formed into an approximately cylindrical shape having a bottom, with a flange part 7b at an intermediate part of the body part 7a. An accommodation hole 7c that extends to the top in the axial direction (driving direction) of the case 7 is formed inside the body part 7a. The tip end of the accommodation hole 7c is open, and an assembly of the tubular member 1, the locking pieces 2, the shaft 3, the propelling spring 4, the pressing spring 5, and the holder spring 6 is accommodated in the accommodation hole 7c. A holding bolt 16 is attached to a screw hole 7f on the rear-end bottom part 7e of the case 7. The holding bolt 16 has a guide part 16a that is thinner than the diameter of said screw hole 7f. The guide part 16a is screwed into said screw hole 7f.

The flange part 7b of the case 7 is mounted to the engine body 200, and the flange part 7b has a mounting hole 7d through which a bolt 270 (FIG. 23) is screwed into the engine body 200. When the flange part 7b is mounted to the engine body 200, as shown in FIG. 23, the tip face of the flange 7b contacts the mounting face 250 of the engine body 200.

At the top of the tubular member 1 are an open rear end 1c and a closed wall 1a, and locking teeth 1b, with which a pair of locking pieces 2 are engaged, are formed on the inner surface of the tubular member 1. When the tensioner is mounted to the engine body 200, as shown in FIG. 23, the tip face of the closed wall 1a of the tubular member 1 contacts the belt or chain guide 240 so as to enable mounting of the tensioner to the engine body 200.

The propelling spring 4, which is a compression spring, is arranged near the inner surface of the accommodation hole 7c of the case 7, between the rear end 1c of the tubular member 1 and the inner surface of the rear-end bottom part 7e of the case 7. The tubular member 1 is pressed by the propelling spring 4, and so it projects from the case 7 and moves in the tensioner's axial direction.

As shown in FIGS. 1 and 3, the guide hole 3b is bored into the shaft 3 from the center of the flange 3a that is formed at the rear end of the shaft 3, and the guide part 16a of the holding bolt 16 that is mounted to the bottom part 7e of the case 7 is inserted into the guide hole 3b so as to be movable forward or backward. A conical inclined cam face 3c, whose diameter is gradually reduced in the driving direction, is formed on the outside of the top of the shaft 3, and a parallel-cut face 3d and a groove 3e are sequentially formed at the rear part of the inclined cam face 3c. The inclined cam face 3c serves as a locking-piece receiver that receives a pair of split-nut-like locking pieces 2, as described below.

The top portion, including the flange part 3a, of the thus-formed shaft 3 is fitted and inserted into the tubular member 1 in such a way that the shaft 3 and the tubular member 1 are axially movable against each other. In such a situation, the outside diameter of the shaft 3 is set slightly smaller than the inside diameter of the locking teeth 1b in the tubular member 1. If hydraulic pressure is applied inside the tubular member 1, the radial gap between the inner surface of the tubular member 1 and the outer surface of the shaft 3 decreases, and a seal 12 is incorporated between the inner surface of the rear end 1c of the tubular member 1 and the outer surface of the shaft 3 so as to ensure sealing of the hydraulic pressure.

The holder spring 6, which is a compression spring, is arranged between the rear-end face of the flange 3a of the shaft 3 and the inner surface of the rear-end bottom part 7e of the case 7. The shaft 3 is pressed in the driving direction of the tubular member 1 by the holder spring 6. Therefore if an excessive load is applied from the engine, the holder spring 6—which has received the backward force of the shaft 3 that receives, on the inclined cam face 3c, the locking pieces 2 that are engaged with the locking teeth 1b of the tubular member 1—is compressed, and the shaft 3 moves backward. As a result, an excessive load is prevented.

As shown in FIGS. 1, 2, and 4, the locking pieces 2 have a parallel-cut face 2d formed by splitting a cylindrical nut, with the locking teeth 2a formed on the outside of the locking pieces 2. A partially conical inclined cam face 2b, whose diameter is gradually reduced in the driving direction of the tubular member 1, is formed on the inside rear ends of the locking pieces 2, and a partially cylindrical small-diameter step part 2c is formed at the tops of the locking pieces 2. The inclined cam face 2b is shaped so as to be slidably and correspondingly fitted with the inclined cam face 3c of the shaft 3. In this embodiment, a pair of locking pieces 2 are arranged opposite each other across the tensioner's longitudinal axis.

The anti-rotation plate 8, which becomes engaged with the parallel-cut face 3d at the top of the shaft 3 and the locking pieces 2 and prevents relative rotation between the shaft 3 and the locking pieces 2, is arranged inside the top of the tubular member 1.

As shown in FIG. 5, the anti-rotation plate 8 has (1) a center hole 8d and is formed by a thin-plate member comprising a flange part 8b, on both sides of which parallel-cut faces are formed, (2) a pair of parallel arms 8a that extend to the parallel-cut faces of the flange part 8b and that are bent at a right angle and extending in the axial direction of said tubular member 1, and (3) pawl parts 8c that are bent at a right angle so that the rear ends of the pair of arms 8a are opposed to each other in the tensioner's axial direction. The parallel-cut faces 3d, 2d of the shaft 3 and the locking pieces 2 are accommodated together between the pair of parallel arms 8a, and the pawl part 8c at the rear end of the anti-rotation plate 8 is fitted with the groove 3e at the top of the shaft 3, and the flange part 8b at the front of anti-rotation plate 8 is fitted to the hollow at the top of the tubular member 1. The locking pieces 2 can move along the inner surfaces of the parallel arms 8a in the axial direction of the tubular member 1, but relative rotation between the shaft 3 and the locking pieces 2 is prevented.

As shown in FIGS. 1 and 2, the pressing spring 5, which is a compression spring, is arranged between the small-diameter step parts 2c of the locking pieces 2 and the flange part 8b of the anti-rotation plate 8. The locking pieces 2 are always pressed toward the inclined cam face 3c of the shaft 3 by the pressing spring 5. In this way, the pressing spring 5 always presses the locking pieces 2 toward the inclined cam face 3c of the shaft 3 in the direction that enlarges the diameter of the locking pieces 2, and therefore the locking teeth 2a, 1b of the locking pieces 2 and the tubular member 1 can be engaged with each other without play, reducing backlash.

The locking teeth 2a, 1b of the locking pieces 2 and the tubular member 1 can be made using any of a spur tooth (rack), single-threaded tooth, or multi-threaded tooth, with the tooth having a lead 0 formed like a groove in a direction orthogonal to the axial direction of said tubular member 1.

If the locking teeth 2a, 1b are spur teeth having a lead 0, there can be used a ratchet mechanism that can be engaged or disengaged without relative rotation of the locking pieces 2 and the tubular member 1. If the locking teeth are threaded teeth, a predetermined strength can be secured. If the teeth are single-threaded teeth, play of the locking teeth 2a, 1b can be prevented by making the pitch small. If the teeth are multi-threaded teeth, play of the locking teeth 2a, 1b can be further prevented by making the pitch even smaller.

In this embodiment, the locking pieces 2, the shaft 3, the pressing spring 5 and the anti-rotation plate 8 are accommodated in the tubular member 1, and the shaft 3, the locking pieces 2, and the tubular member 1 are sequentially arranged from the axial core toward the outside. The locking pieces 2 and the tubular member 1 are arranged—while being engaged with each other—in the accommodation hole 7c of the case 7.

The above-mentioned tensioner of Embodiment 1 has a ratchet mechanism that can drive the tubular member 1 in the driving direction of the tubular member 1 by moving in the direction that reduces the diameter of the locking pieces 2, thereby enabling the locking teeth 3a to climb over the locking teeth 1b on the inner surface of the tubular member 1, and—by being engaged with the locking teeth 2a, 1b of the locking pieces 2 and the tubular member 1—to prevent the backward movement of the tubular member 1.

The ratchet mechanism includes (1) inclined cam faces 3c, 2b of the shaft 3 and locking pieces 2, with said inclined cam faces serving to enlarge the diameter of the locking pieces 2 in the direction for the locking pieces 2 to be engaged with the locking teeth 1b on the inner surface of the tubular member 1, and (2) a pressing spring 5 that presses the locking pieces 2 against the inclined cam face 3c of the shaft 3 in the direction that enlarges the diameter of the locking pieces 2. When the tubular member 1 moves forward, the locking pieces 2 move in their diameter-reducing direction along the inclined cam face 3c of the shaft 3 so as to press against the inclined cam face 3c, and the locking teeth 2a climb over the locking teeth 1b on the inner surface of the tubular member 1, as a result of which the tubular member 1 can move forward. When the tubular member 1 moves backward, the locking pieces 2 are pressed against the inclined cam face 3c of the shaft 3 and moved in the direction that enlarges the diameter of the locking pieces 2, whereby the locking teeth 2a of the locking pieces 2 are engaged with the locking teeth 1b on the inner surface of the tubular member 1, which prevents backward movement of the tubular member 1.

The detailed actions of Embodiment 2, which has a constitution basically similar to that of Embodiment 1, of the tensioner of the present invention will now be explained concretely.

In Embodiment 1, which has the above-mentioned constitution, the locking pieces 2 and the shaft 3 are accommodated inside the tubular member 1. The shaft 3, a pair of locking pieces 2, and the tubular member 1 are sequentially arranged from the tensioner's axial core toward the outside. In a conventional tensioner, two spaces 2C are necessary in the outer part of the inside of the tensioner when the locking pieces 2 climb over the locking teeth 1b on the inner surface of the tubular member 1 when the tubular member 1 moves forward. However, in Embodiment 2, the locking pieces 2 move in the direction that reduces their diameter and enable them to climb over the locking teeth 1b, and therefore it is not necessary to provide a gap C in the outer part of the inside of the tensioner. Furthermore, it is not necessary to provide a holder member 330 as in a conventional tensioner. Therefore if the outside diameter of the case body 7a is the same as the outside diameter d5 of the case of a conventional tensioner (see FIG. 24), then because the present invention's tensioner does not need the spaces that are necessary for a gap C or a holder member 330 in the conventional tensioner, such spaces—called "radial dimensions"—can instead be used to increase the diameter of the tubular member 1.

As the diameter of the tubular member 1 is increased, the rigidity of the tubular member 1 against a lateral load also increases. If the outside diameter of the tubular member 1 is the same as the outside diameter d5 of the case body of a conventional tensioner, the rigidity of the locking teeth 2a, 1b on the inner surfaces of the locking pieces 2 and the tubular member 1 can be set so as to endure a large load. If the inside diameter d1 of the tubular member 1 is the same as the outside diameter d1 of the drive member of the conventional tensioner, the tensioner of the present invention can be made thinner and more compact than a conventional tensioner, while maintaining the same rigidity of the locking teeth 2a, 1b of a conventional tensioner.

Table 1 compares the dimensions (unit: mm) of the main parts of the present invention's tensioner and of a conventional tensioner. The symbols are as shown in FIGS. 1 and 24.

TABLE 1

(Unit: mm)

| Dimensions of Main Parts (reference characters) | Conventional tensioner | Example 1 of Present Invention | Example 2 of Present Invention |
|---|---|---|---|
| Height of locking teeth 1b (h) | 0.5 | 0.5 | 0.5 |
| Gap (C) | 1 | 1 | 1 |
| Outside diameter (inside diameter) of locking teeth 1b (d1) | 8 | 8 | 12 |
| Outside diameter of locking piece 2 (d2) | 12 | — | — |
| Inside diameter of holder member 3 (d3) | 14 | — | — |
| Outside diameter of holder member 3 (d4) | 16 | — | — |
| Outside diameter of case body 7a (d5) | 20 | 16 | 20 |
| Outside diameter of drive member 1 (d10) | 8 | 12 | 16 |

In Example 1 of the present invention's tensioner, the outside diameter d1 of the tubular member 1 is the same as the outside diameter d1 of the locking teeth of a conventional drive member, provided that the outside diameter d5 of the body part 7a of the conventional tensioner's case is 20 mm. In such a situation, the outside diameter d5 of the body part of the conventional tensioner's case must be about 20 mm, but in Example 1 of the present invention, about 16 mm will be enough for the outside diameter d5 of the body part of the tensioner's case. In this way, the present invention's tensioner can be made more compact than a conventional one. Furthermore, if the outside diameter d5 of the body part 7a is the same as that of a conventional tensioner's body part, the present invention's tensioner can endure a much larger load than a conventional tensioner can.

In Example 2 of the present invention, the outside diameter d5 of the body part 7a is the same as the outside diameter of a conventional tensioner's body part. In this case, the outside diameter d1 of the locking teeth 1b of the tubular member 1 can be 12 mm, which is larger than the outside diameter (8 mm) of the conventional tensioner's locking teeth. The reason for this is as described above.

Embodiment 2

FIG. 6(a) is a vertical cross-sectional view of the tensioner of Embodiment 2 of the present invention, and FIG. 6(b) is a cross-sectional view along the line B-B of FIG. 6(a). FIG. 7 is an exploded perspective view of a main part (ratchet mechanism part) at the top of the tensioner of Embodiment 2. FIG. 8(a) is a side view of the shaft of Embodiment 2, and FIGS. 8(b) and 8(c) are a plane view and a right-side view, respectively, of the shaft. FIG. 9(a) is a side view of the locking pieces of Embodiment 2, and FIGS. 9(b) and 9(c) are a right-side view and a left-side view, respectively, of the locking pieces. FIG. 10(a) is a side view of the anti-rotation plate of Embodiment 2, and FIGS. 10(b) and 10(c) are a plane view and a left-side view, respectively, of the anti-rotation plate. FIG. 11(a) is a side view of the holding plate of Embodiment 2, and FIG. 11(b) is a left-side view of the holding plate.

The constitution of Embodiment 2 is similar to that of Embodiment 1, except that
  the shape of the shaft 3 and the structure for mounting the shaft 3 to the rear end of the case 7 are different from those of Embodiment 1,
  a holding plate 9 is added between the locking pieces 2 and the pressing spring 5, and
  the shape of the anti-rotation plate 8 and the shape of the contact part between the locking pieces 2 and the holding plate 9 are different.
  These changes will be explained below.

The constitution of the case 7 of this embodiment is similar to that of Embodiment 1, except that
  in this embodiment the case 7 is provided with a protrusion 7g that extends in the tensioner's axial direction to the intermediate part in the accommodation hole 7c at the center of the rear-end bottom part 7e, and
  a guide hole 7h is located at the center of the protrusion 7g.

The outside diameter of the protrusion 7g of the case 7 is slightly smaller than the inside diameter of the locking teeth 1b in the tubular member 1. By making small the radial gap between the inner surface of the tubular member 1 and the outer surface of the protrusion 7g, a sealing property is provided when hydraulic pressure is applied to the tubular member 1. If an even higher sealing property is required, a seal 12 can be incorporated between the inner surface of the rear end 1c of the tubular member 1 and the outer surface of the protrusion 7g.

As shown in FIGS. 6 and 8, a screw part 3f is provided at the rear of the shaft 3, and the shaft is fitted with and inserted into the guide hole 7h—in such a way that the shaft is movable forward or backward—of the protrusion 7g at the bottom part 7e of the case 7. Under this condition, a below-described nut 17 is screwed to the screw part 3f.

The conical inclined cam face 3c—whose diameter is gradually reduced in the driving direction and which has an umbrella-shaped step-end face 3g that has a diameter larger than that of the shaft part—is formed on the outside of the shaft 3 at the top of the shaft 3. A parallel-cut face 3d and a small-diameter shaft part 3h, in which a groove 3i is bored, are continuously formed at the top of the inclined cam face 3c. This inclined cam face 3c serves as a below-described locking-piece receiver, which receives a pair of split-nut-like locking pieces 2. The outside diameter of the step part 3g is slightly smaller than the inside diameter of the locking teeth 1b inside the tubular member 1. The functions of the parallel-cut face 3d and the small-diameter shaft part 3h will be described later.

Also in this Embodiment 2, the holder spring 6, which is a compression spring, is fitted with the shaft part of the shaft 3 between the rear-end face of the step part 3g of the shaft 3 and the tip face of the protrusion 7g. This holder spring 6 presses the shaft 3 in the driving direction of the tubular member 1. As a result, if an excessive load from the engine is applied to the tensioner, the holder spring 6 receives the backward force of the shaft 3 that receives—at the inclined cam face 3c—the locking pieces 2 engaged with the tubular member 1. As a result, the holder spring 6 is compressed, and the shaft 3 moves backward. Thus, an excessive load is prevented.

As shown in FIGS. 6, 7, and 9, the locking pieces 2 are shaped so that a parallel-cut face 2d is formed by splitting a cylindrical nut that has locking teeth 2a formed on the nut's outside. A partially-conical inclined cam face 2b whose diameter is gradually reduced in the driving direction of the tubular member 1 is formed inside the tubular member 1 at the rear ends of the locking pieces 2. A partially-cylindrical small-diameter step part 2c whose diameter is gradually reduced in the driving direction of the tubular member 1 is formed at the tops of the locking pieces 2. The inclined cam face 2b is shaped to correspondingly fit slidably with the inclined cam face 3c of the shaft 3. Also in this embodiment, a pair of locking pieces 2 are arranged opposite each other across the tensioner's longitudinal axis.

Also, an anti-rotation plate 8, which is engaged with the locking pieces 2 and with the parallel-cut face 3d at the top of the shaft 3, and which prevents relative rotation between the shaft 3 and the locking pieces 2, is fixed to the small-diameter step parts 2c at the tops of the locking pieces 2.

As shown in FIG. 10, the anti-rotation plate 8 has a center hole 8d, and is integrally formed with a thin-plate member that comprises (1) a flange part 8b on both sides of which parallel-cut faces 8e are formed, and (2) a pair of parallel arms 8a that extend to the parallel-cut faces 8e of the flange part 8b that is bent at a right angle and extends in the tensioner's axial direction.

The parallel-cut faces 3d, 2d of the shaft 3 and the locking pieces 2 are tightly accommodated together between a pair of parallel arms 8a. As shown in FIG. 6, the flange part 8b at the top is fitted with the small-diameter step parts 2c of the locking pieces 2 and is inserted into the small-diameter shaft part 3h of the shaft 3 via a hollow hole 8d. By this anti-rotation plate 8, the locking pieces 2 are able to move—integrally with the anti-rotation plate 8—in the axial direction of the tubular member 1, but relative rotation between the shaft 3 and the locking pieces 2 is prevented.

As shown in FIGS. 6 and 7, the holding plate 9 that holds the pressing spring 5 is arranged movably in the tensioner's axial direction—at the small-diameter shaft part 3h at the top of the shaft 3—between the partially-conical small-diameter step part 2c of the locking pieces 2 and the inner surface of the closed wall 1a at the top of the tubular member 1.

As shown in FIGS. 6 and 11, the holding plate 9 has (1) an outer flange part 9b at the top of an approximately-cylindrical body, and (2) an inner flange part 9d, for which a center circle hole 9a is bored at the axial intermediate part on the inner surface of the holding plate 9. Furthermore, the conical inclined cam face 9c, whose diameter is gradually reduced in the driving direction, is formed at the top of the holding plate 9.

The circle hole 9a of the holding plate 9 is slidably fitted to the small-diameter shaft part 3h of the shaft 3, and the tip face of the inner flange part 9d contacts a C-ring 10 that is engaged with the groove 3i of the small-diameter shaft part 3h, and therefore the holding plate 9 is prevented from detaching from the top of the small-diameter shaft part 3h. The inclined cam face 9c of the holding plate 9 is formed into a shape corresponding to the partially conical small-diameter step parts 2c of the locking pieces 2, contacts those partially conical small-diameter step parts 2c, and is pressed by them. Therefore when the tubular member 1 moves forward, movement of the locking pieces 2 in the direction that reduces their diameter is induced.

Furthermore, as shown in FIGS. 6 and 7, the pressing spring 5, which is a compression spring, is arranged on the outside of the cylindrical body of the holding plate 9 between the front face of the flange part 8b of the anti-rotation plate 8 that is fitted with the small-diameter step parts 2c of the locking pieces 2 and the rear face of the outer flange part 9b of the holding plate 9. The pressing spring 5 always presses the locking pieces 2 toward the inclined cam face 3c of the shaft 3. In this way, the pressing spring 5 always presses the locking pieces 2 toward the inclined cam face 3c of the shaft 3 in the direction that enlarges the diameter of the locking pieces 2, and therefore the locking teeth 2a, 1b of the locking pieces 2 and the tubular member 1 can be engaged with each other without play, thereby reducing backlash.

In this Embodiment 2, the locking pieces 2, the shaft 3, the pressing spring 5, the anti-rotation plate 8, and the holding plate 9 are accommodated in the tubular member 1, and the shaft 3, the locking pieces 2, and the tubular member 1 are sequentially arranged from the tensioner's axial core toward the outside. The locking pieces 2 and the tubular member 1 are arranged in the accommodation hole 7c of the case 7 while they are engaged with each other. At that time, the nut 17—which is screwed to the screw part 3f of the shaft 3 while the shaft part of the shaft 3 is fitted to and inserted into the guide hole 7h of the protrusion 7g of the case 7—is fastened and adjusted so that a predetermined initially-set compression force of the holder spring 6, which is fitted with the shaft part of the shaft 3 and elastically mounted between the step part 3g and the protrusion 7g of the case 7, can be obtained.

Embodiment 2, which has the above-mentioned constitution, as is similar to that of Embodiment 1, has a ratchet mechanism that can drive the tubular member 1 in the driving direction of the tubular member 1 by moving in the direction that reduces the diameter of the locking pieces 2 and causes the locking teeth 3a to climb over the locking teeth 1b on the inner surface of the tubular member 1, and, as a result, said ratchet mechanism prevents the backward movement of the tubular member 1 by providing a backwards locking function due to the engagement of the locking teeth 2a, 1b with the locking pieces 2 and the tubular member 1.

In Embodiment 2, the locking pieces 2 and the shaft 3 are accommodated in the tubular member 1, and the shaft 3, the locking pieces 2 and the tubular member 1 are sequentially arranged from the tensioner's axial core outward, and the locking pieces 2 move in the direction that reduces their diameter and enables them to climb over the teeth, and therefore there is no need to provide a gap (2C: see FIGS. 25 and 26) toward the outer portion of the tensioner as is necessary for a conventional tensioner. Thus, the space for such a gap can instead be used for increasing the diameter of the tubular member 1, and the tensioner can be made such that the rigidities of the locking teeth 2a, 1b on the inner surfaces of the locking pieces 2 and the tubular member 1 are high enough to endure a large load. Also, the entire tensioner can be made thin and compact while securing a predetermined strength of the locking teeth 2a, 1b.

FIG. 12 shows the actions of the tensioner of Embodiment 2. FIG. 12(a) shows an excessive load condition when the engine is operating at a temperature higher than normal, FIG. 12(b) shows a proper load condition while the engine is operated normally, and FIG. 12(c) shows a light load condition when the engine is operating at a colder temperature than normal.

As described earlier, the distance between the crank shaft and the cam shaft, around which a timing chain is hooked, changes due to thermal expansion of the engine block resulting from an increase of the temperature inside the engine, and the timing chain becomes loose at a low temperature and becomes tight at a high temperature. Thus, the load in the tensioner that presses and holds the timing chain is excessive when the engine is operating at a higher temperature than normal, is proper when the engine is normally operated, and is light when the engine is operating at a colder temperature than normal.

Under an excessive-load condition when the engine is operating at a higher temperature than normal, as shown in FIG. 12(a), when the tubular member 1, which receives the excessive load from the timing chain, moves backward, the locking pieces 2 are pressed against the inclined cam face 3c of the shaft 3, the diameter of the locking pieces 2 is enlarged, and the locking teeth 1b of the tubular member 1 become engaged with the locking teeth 2a of the locking pieces 2. Under this condition, the shaft 3 is further pressed against the tubular member 1 that accommodates the locking pieces 2, and therefore the holder spring 6 is compressed and the umbrella-shaped step-end face 3g of the shaft 3 moves backward to the position P1. At that time, the tip face of the tubular member 1 is located at the position P3.

Under a proper load condition when the engine is normally operated, as shown in FIG. 12(b), the locking teeth 1b of the tubular member 1, which receives the proper load from the timing chain, are engaged with the locking teeth 2a of the locking pieces 2, and a backlash-free (gap-free) condition is maintained. Under an excessive-load condition, the shaft 3 moves forward from the position P1 to the position P2 on the umbrella-shaped step-end face 3g, and the tubular member 1 moves forward from the position P3 to the position P4 on the tip face of the tubular member 1, Under a light load condition when the engine is operating at a temperature that is colder than normal, as shown in FIG. 12(c), both the tubular member 1, which receives the light load from the timing chain, and the locking pieces 2 start to move forward, and the locking pieces 2, while moving forward, slide in the inside-diameter direction shown by the arrow in FIG. 12(c). The locking teeth 1b of the tubular member 1 then start to become disengaged from the locking teeth 2a of the locking pieces 2. When the tubular member 1 moves further forward, the locking teeth 2a of the locking pieces 2 climb over one locking tooth 1b of the tubular member 1, and both of the locking teeth 2a, 1b become engaged with each other again, similarly to when a proper load is applied. At that time, and under a proper load condition, the shaft 3 still remains at the position P2 on the umbrella-shaped step-end face 3g, and the tip face of only the tubular member 1 is moved forward from the position P4 to the position P5.

The propelling spring 4, the pressing spring 5, and the holder spring 6, which are compressing springs in the above-explained Embodiments 1 and 2, are incorporated in the tubular member 1 while the relative balance of the setting compression force is adjusted so as to enable satisfactory action of the tensioner under the above-mentioned load conditions of engine operation.

Embodiment 3

FIG. 13 shows a vertical cross-section of a tensioner of Embodiment 3 of the present invention, and FIG. 14 is an exploded perspective view of a main part (ratchet mechanism part) at the top of the tensioner of Embodiment 3.

In Embodiment 3, the entire assembly, which is accommodated in the case 7 of Embodiments 1 and 2, is arranged so that the front and the back in the axial direction are reversed, and the entire assembly has a simple structure that omits the case 7 and the holder spring 6. The tubular member 1 is inserted directly into the mounting hole 260 of the engine body 200 and fixed to the engine body 200, and the tubular member 1 functions as a drive member so that the shaft 3 is moved forward. The constitution of Embodiment 3 is basically similar to that of Embodiment 2, except that in Embodiment 3 the shapes of the tubular member and both ends of the shaft 3 are slightly different from those of Embodiment 2, and the structure for mounting the tubular member 1 to the engine body 200 is different from that of Embodiment 2.

The tubular member 1 in this Embodiment 3 is open at both ends, and the locking teeth 1b, with which a pair of locking pieces 2 are engaged, are formed on the entire inner surface of the tubular member 1, and an outer flange part 1d is provided at the rear end of the tubular member 1. The body part at the front of the outer flange part 1d of the tubular member 1 is inserted into the mounting hole 260 together with the below-described holder spring 6, which is arranged on the outside of the tubular member 1, and the outer flange part 1d is covered with a cap-like mounting cover 11 while the outer flange part 1d contacts the mounting face 250 of the engine body 200.

As shown in FIG. 14, bolts 21 are inserted into bolt mounting holes 11b that are formed on the flange part 11a, and said bolts 21 are screwed to female screw holes 215 on the mounting face 250 of the engine body 200, and the cap-like mounting cover 11 is fixed to the mounting face 250 of the engine body 200 together with the outer flange part 1d of the tubular member 1.

The shaft 3 of Embodiment 3 is provided with an outer flange 3a that projects from the tip 1c' at the top of the tubular member 1, and the shaft part at the rear side of the outer flange 3a is inserted into the tubular member 1. The tip face of the outer flange 3a contacts the belt or chain guide (not shown), and the shaft 3 moves forward and backward. In this situation, the outside diameter of the insertion part of the shaft 3 is set slightly smaller than the inside diameter of the locking teeth 1b in the tubular member 1. The strength against the lateral load of the shaft 3 and the tubular member 1 can be increased by reducing the radial gap between the inner surface of the tubular member 1 and the outer surface of the shaft 3. Also, if hydraulic pressure is applied to the tubular member 1, a gap suitable for sealing is provided, and therefore a sealing function can be provided. Furthermore, if increased sealing is required, a seal 12 can be incorporated between the inner face at the top of the tubular member 1 and the outer surface of the shaft 3, so that hydraulic-pressure sealing is secured.

The conical inclined face 3c, whose diameter is gradually enlarged in the driving direction, is formed on the outside rear end of the shaft 3, and a parallel-cut face (not shown) and a small-diameter shaft part 3h, on which a groove 3i is bored, are continuously formed at the rear end of the conical inclined face 3c. The inclined cam face 3c serves as a locking-piece receiver that receives a pair of split-nut-like locking pieces 2, as is similar to the above-mentioned embodiments.

A propelling spring 4, which is a compression spring, is arranged in the mounting hole 260 of the engine body 200 between the rear face of the outer flange 3a of the shaft 3 and the front face of the outer flange part 1d of the tubular member 1 while that propelling spring 4 is fitted to the body part of the tubular member 1. The shaft 3 is pressed by the propelling spring 4, and so the shaft 3 projects from the tubular member 1 and moves forward in the axial direction.

This embodiment omits the holder spring 6 that is in Embodiments 1 and 2. If an excessive load is applied from the engine, the tubular member 1, which is engaged with the locking pieces 2 that are pressed by the inclined cam face 3c, receives the backward force of the shaft 3, and excessive load can be prevented by pressing the mounting cover 11 and deforming the mounting flange part. However, this embodiment is suitable, as a simplified type wherein a holder spring for preventing an excessive load is omitted, for small or medium-size engines that are operated with a lighter load than are the engines typically used with Embodiments 1 and 2.

The locking pieces 2 of Embodiment 3 are used so that the front and back of the locking pieces 2 of Embodiments 1 and 2 are reversed. The partially-conical inclined cam face 2b, whose diameter is gradually enlarged in the driving direction of the shaft 3, is formed inside the shaft 3 at the tip of the locking pieces 2, and a small-diameter step part 2c is formed at the rear end of the locking pieces 2. The shapes of other parts are similar to those of Embodiments 1 and 2. Also in this embodiment, a pair of locking pieces 2 are opposed to each other across the tensioner's longitudinal axis.

In this embodiment, the holding plate 9 is slidably fitted to the small-diameter shaft part 3h of the shaft 3, and a C-ring 10 that is engaged with the groove 3i of the small-diameter shaft part 3h prevents the holding plate 9 from being detached from the rear end of the small-diameter shaft part 3h.

Furthermore, the pressing spring 5, which is a compression spring, is arranged between the holding plate 9 and a washer 8' that is fitted to the small-diameter step parts 2c of the locking pieces 2. The locking pieces 2 are always pressed by the pressing spring 5 toward the inclined cam face 3c of the shaft 3 in the direction that enlarges the diameter of the locking pieces 2. As a result, the locking teeth 2a, 1b of the locking pieces 2 and the tubular member 1 can be engaged with each other without play, reducing backlash. Also, in this example, a washer 8' is provided instead of the anti-rotation plate 8 of Embodiments 1 and 2, and therefore the locking pieces 2 can rotate around the inclined cam face 3c of the shaft 3.

In Embodiment 3, which has the above-mentioned constitution, a ratchet mechanism that is similar to that of Embodiments 1 and 2, enables the shaft 3 to move forward by moving the locking pieces 2 in their diameter-reducing direction and the driving direction and making the locking teeth 2a climb over the locking teeth 1b on the inner surface of the tubular member 1. Also, a locking condition resulting from the engagement of the locking teeth 2a, 1b of the locking pieces 2 and the tubular member 1 is provided in the backward direction, and therefore the shaft 3 is prevented from moving backward. Actions similar to those of Embodiments 1 and 2 can be performed corresponding to a proper load condition if a small engine is operated normally and corresponding to a light load condition if a small engine is operated at a temperature colder than normal.

In Embodiment 3, the locking pieces 2 and the shaft 3 are accommodated in the tubular member 1, and the shaft 3, the locking pieces 2, and the tubular member 1 are sequentially arranged from the tensioner's axial core toward the outside, and the locking pieces 2 move in the direction that reduces their diameter and enables them to climb over the locking teeth 2a, and therefore there is no need to provide a gap (2C: see FIGS. 25 and 26) toward the outside of the tensioner, as is required for a conventional tensioner. Thus, the gap can be used for increasing the diameter of the tubular member 1, and the tensioner can be made such that the rigidities of the locking teeth 2a, 1b on the inner surfaces of the locking pieces 2 and the tubular member 1 can endure a large load. Also, the entire tensioner can be made thin and compact while securing a predetermined strength of the locking teeth 2a, 1b.

In addition, Embodiment 3 omits the case 7 and the holder spring 6 of Embodiments 1 and 2, and therefore the structure of the tensioner is simplified and made compact and light, which reduces the tensioner's cost.

FIG. 15 is a vertical cross-sectional view of a tensioner in a variation of Embodiment 3, FIG. 16(*a*) is a side view (partial vertical-cross-sectional view) of the shaft of FIG. 15, and FIGS. 16(b) and (c) are a plane view and a left-side view, respectively, of the tensioner.

The constitution of this variation is similar to that of Embodiment 2, except that (1) only one of the locking pieces 2 of Embodiment 2 is provided on one side relative to the center shaft, and (2) the constitution and shape of the locking-piece receiver at the rear end of the shaft 3 differ somewhat from those of Embodiment 2.

This variation includes on the outside rear end of the shaft 3 a cam groove 3j that has a planar inclined cam face 3c whose diameter is gradually enlarged in the driving direction, and a parallel-cut face (not shown) is formed on the outside rear end of the shaft 3. The cam groove 3j has a groove whose width is adequate for slidably accommodating the locking piece 2, and therefore relative rotation of the locking piece 2 and the shaft 3 is prevented, and the inclined cam face 3c serves as a locking-piece receiver that receives the locking piece 2.

Accordingly, this variation omits the anti-rotation plate 8 that is in the above-mentioned embodiment, and the constitution of the tensioner is further simplified. Thus, the cost can be reduced, and the tensioner is suitable for small engines operated at a light load.

The locking piece 2 in this variation is a variation of the locking piece 2 of Embodiment 3, in which the front and back of the locking pieces 2 of Embodiments 1 and 2 are reversed. The rear end of the locking piece 2 is formed into a vertical face, and the locking teeth 2a are formed on the outside of the locking piece 2. A planar, inclined cam face 2b, whose diameter is gradually enlarged in the driving direction of the shaft 3, is formed on the inner periphery of the locking piece 2, and the locking piece 2 is formed into a wedged split-nut-shape that has a parallel-cut face (not shown). The inclined cam face 2b has a correspondingly inclined shape that contacts the inclined cam face 3c of the shaft 2.

Also, a screw hole 3k is bored in the rear-end face of the shaft 2, and the holding plate 9 is fixed to the rear-end face of the shaft 3 by a screw member 19 that is screwed into the screw hole 3k.

Furthermore, a pressing spring 5, which is a small-diameter compression spring, is arranged between the holding plate 9 and the rear-end face of the locking piece 2, and the front half of the pressing spring 5 is fitted with and inserted into the cam groove 3j of the shaft 3.

The variation having the above-described constitution can have actions and effects similar to those of Embodiment 3.

Embodiment 4

FIG. 17(a) is a side view (main part vertical-cross-sectional view) of a tensioner of Embodiment 4 of the present invention, and FIG. 17(b) is a plane view of the tensioner. FIG. 18(a) is a plane view of the bracket of Embodiment 4, and FIG. 18(b) is a left-side view of the bracket.

The constitution of Embodiment 4 is similar to that of Embodiment 3, except that (1) the structure for mounting the rear end of the tubular member 1 to the engine body 200 differs from that of Embodiment 3, (2) hydraulic pressure 301 from a hydraulic pressure source 300 is applied in the tubular member 1, and (3) the hydraulic pressure 301 is applied in the direction in which the shaft 3 moves forward.

The tubular member 1 in this Embodiment 4 is open at both ends, and locking teeth 1b, with which a pair of the locking pieces 2 are engaged, are formed on the inner surface of the tubular member 1. A seal 12 is mounted between the inner surface at the top of the shaft 3 and the outer face of the shaft 3, and a blind cover 14 is fitted to the inner surface at the rear end of the tubular member 1. Also, a hydraulic-flow communication port 1e is bored in the body part at the rear end of the tubular member 1, and hydraulic pressure 301 from the hydraulic pressure source 300 that is provided on the side of the engine body 200 is applied inside the tubular member 1 via the hydraulic-pressure-flow communication port 1e.

As is similar to each of the above-mentioned embodiments, a seal 12 seals the hydraulic pressure in the tubular member 1, and the seal 12 prevents detachment of the shaft 3 from said tubular member 1. Accordingly, if the shaft 3 continues to move forward, the locking teeth 2a of the locking pieces 2 that are incorporated in the inclined cam face 3c at the rear end of the shaft 3 press against the seal 12, and therefore the forward movement of the shaft 3 is prevented.

The tubular member 1 is mounted by a U-shaped clamp 13 via two bolt members 20, while the downward outer surface at the rear end of the tubular member 1 is arranged in a shallow concave-shaped mounting groove 202 that is bored on the inner wall 201 of the engine body 200. At that time, the hydraulic-pressure-flow communication port 302, which is connected to the hydraulic pressure source 300 on the side of the engine body 200, and the hydraulic-pressure-flow communication port 1e of the body part at the rear end of the tubular member 1 are set to be opposed to, and to coincide with, each other via a seal 303 that is fitted around the hydraulic-pressure-flow communication port 302.

As shown in FIGS. 17 and 18, the U-shaped clamp 13 has a pawl part 13e that is bent perpendicularly downward (toward the mounting face 250) continuously with the rear face at the peak part of the center cylindrical face part 13a, and the bolt mounting holes 13c, through which the bolt members 20 are inserted, are open on both horizontal-end parts 13b. The pawl part 13e contacts the top on the rear-end face of the tubular member 1 while the tubular member 1 is mounted to the engine body 200 by the U-shaped clamp 13, and therefore there is provided a way to prevent the tubular member 1, which receives a load from the belt or chain guide 240 that the tip face of the outer flange 3a of the shaft 3 contacts, from sliding and moving backward.

Also, as shown in FIG. 17, a relief part 203 for the outer flange 3a of the shaft 3 and the belt or chain guide 240 is provided on the inner wall 201 of the engine body 200 in the driving direction of the shaft 3 continuously with the mounting groove 202.

Also, a propelling spring 4 is arranged between the front face of the tubular member 1 and the rear face of the outer flange 3a of the shaft while being fitted to the body part of the tubular member 1, and the shaft 3 is pressed by the propelling spring 4, which projects from the tubular member 1, and moves forward in the axial direction.

This embodiment, as is similar to Embodiment 3, omits the holder spring 6 that is in Embodiments 1 and 2 to prevent an excessive load.

Embodiment 4, having the above-mentioned constitution, has actions and effects similar to those of Embodiment 3. In addition, hydraulic pressure is applied in the tubular member 1 in the driving direction of the shaft 3, and therefore the driving force of the shaft 3 is increased. Accordingly, a small propelling spring 4 whose compression force is set low is used. Also, a damping effect and lubricating effect due to the viscosity resistance of the hydraulic oil are additionally provided against the action of movable members like the shaft 3 and the locking pieces 2, and therefore the amplitude of the shaft 3 when the shaft 3 moves forward or backward is stably prevented, abrasion of the movable members is prevented, and durability of the movable members is improved.

Therefore, Embodiment 4 has a degree of design freedom that can be applied to small engines that operate at a comparatively light load, as well as to medium-size engines that operate at an intermediate load.

Embodiment 5

FIG. 19(a) is a side view (main part vertical-cross-sectional view) of a tensioner of Embodiment 5, and FIG. 19(b) is a plane view of the tensioner.

The constitution of Embodiment 5 is similar to that of Embodiment 4, in which the hydraulic pressure 301 is applied in the direction in which the shaft 3 moves forward, except that (1) the shape of the tubular member 1 at its rear end and the structure for mounting the rear end of the tubular member 1 to the engine body 200 differ from those of Embodiment 4, and (2) the shaft 3 is split into two, with those two parts connected with each other while a holder spring 6 is mounted between the two.

The tubular member 1 in this Embodiment 5 is open at both ends. Also. locking teeth 1b, with which a pair of the locking pieces 2 are engaged, are formed on the entire inner surface of the tubular member 1, and a seal 12 is mounted between the inner surface of the shaft 3 at the top of the shaft 3 and the outer surface of the shaft 3. The seal 12 seals the hydraulic pressure in the tubular member 1, and prevents detachment of the shaft 3 from said tubular member 1. Also, a hexagonal nut part 1d is formed on the outer rear-end surface of the tubular member 1.

In this embodiment, the locking teeth 1b on the inner rear-end surface of the tubular member 1 are screwed to a male screw part 207 that projects at the step end 206 of a low step part 205 on the inner wall 201 of the engine body 200. Therefore, when the tubular member 1 is mounted to the engine body 200, mounting members such as the U-shaped clamp 13 and two bolt members 20 used in Embodiment 4 are not needed.

A hydraulic-pressure-flow communication port 302 is bored in the male screw part 207 of the engine body 200 in the tensioner's axial direction, and hydraulic pressure 301 from the hydraulic pressure source 300 on the engine body 200 side is applied inside the tubular member 1 via the hydraulic-pressure-flow communication port 302. As a result, the hydraulic pressure 301 is applied in the direction in which the shaft 3 moves forward.

The shaft 3 of Embodiment 5 is split into two parts—a front-end shaft 31 and a rear-end shaft 32—and these two parts are connected with each other by the connection member 33 described below.

The front-end shaft 31 has a bottom part 31b, at the rear end of which is a center hole 31c, and the top of this front-end shaft 31 is formed into a cylinder that has an open top and a bottom. The shaft part 31a at the rear end is fitted with and inserted into the tubular member 1 from the outer flange 3a on the outer surface at the top of the tubular member 1, and the tip face of the outer flange 3a that projects from the front-end 1c of the tubular member 1 contacts the belt or chain guide 240 and moves forward and backward. In this situation, the outside diameter of the shaft part 31a is set lightly smaller than the inside diameter of the locking teeth 1b in the tubular member 1. By making the radial gap between the inner surface of the tubular member 1 and the outer surface of the shaft part 31a small, if hydraulic pressure is applied to the tubular member 1 the sealing property of the hydraulic pressure 301 is secured by the seal 12 between the inner surface at the rear end of the tubular member 1 and the outer surface of the shaft part 31a, and the front-end shaft 31 is prevented from being detached from the tubular member 1.

The conical, inclined cam face 3, whose diameter is gradually enlarged in the driving direction and which has an umbrella-shaped step-end face 3g whose diameter is larger than that of the shaft part 32a, is formed on the outside at the rear end of the rear-end shaft 32, and the parallel-cut face 3d and the small-diameter shaft part 3h, at the rear end of which is the groove 3i, are sequentially formed. As is similar to Embodiment 4, the inclined cam face 3c serves as a locking-piece receiver that receives a pair of split-nut-like locking pieces 2. Furthermore, a female screw hole 32b is bored in the axial direction at the center of the tip face of the shaft part 32a.

While the holder spring 6 is fitted to the shaft part 32a of the rear-end shaft 32 between the umbrella-shaped step-end face 3g of the rear-end shaft 32 and the rear-end face of the front-end shaft 31, the holder spring 6 is screwed to the female screw hole 32b on the rear-end shaft 32 by a bolt member (connection member) 33, which has a collar 33a and which is slidably inserted into the center hole 31 of the rear-end bottom part 31b from the front-end opening of the front-end shaft 31. As a result, the front-end shaft 31 is guided to the rear-end shaft 32 by the connection member 33 and moves freely forward or backward in the axial direction while being pressed by the holder spring 6 in the driving direction. When assembled, a predetermined mounting length of the holder spring 6 is adjusted by the bolt member 33, which has a collar, to obtain a predetermined initial biasing force (compression force) of the holder spring 6.

A propelling spring 4 is arranged between the rear face of the outer flange 3a of the front-end shaft 31 and the front end of the tubular member 1 while being fitted to the body part of the tubular member 1. Under that connected condition, the shaft 3 is pressed by the propelling spring 4 and projects toward the outer flange 3a of the front-end shaft 31 from the tubular member 1 and moves forward in the axial direction.

As is similar to Embodiments 3 and 4, in Embodiment 5 a ratchet mechanism enables the shaft 3, under the condition that the front shaft member 31 is connected to the rear shaft member 32, to move forward by moving the locking pieces 2 in the direction that reduces the diameter of the locking pieces 2 (the driving direction) and that causes the locking teeth 2a to climb over the locking teeth 1b on the inner surface of the tubular member 1. Backward movement of the shaft is prevented by providing a locking function that results from the engagement of the locking teeth 2a, 1b of the locking pieces 2 with the tubular member 1.

Also, if excessive load is applied from the engine, the holder spring 6—which receives the backward force via the front-end shaft 31 of the shaft 3, which receives the locking pieces 2 engaged with the tubular member 1 by the inclined cam face 3c—is compressed, and the front-end shaft 31 moves backward, and therefore excessive load can be avoided.

Furthermore, Embodiment 5, in addition to having actions and effects similar to those of Embodiment 4, and instead of having a structure for mounting the tubular member 1 of Embodiment 4 to the inner wall 201 of the engine body 200 by using a U-shaped clamp 13, directly screws the tubular member 1 to the male screw part 207 on the inner wall 201 of the engine body 200. Also, excessive load is prevented by the separately added holder spring 6, and therefore a much larger load from the engine body 200 can be endured.

As described above, Embodiment 5 can be applied to a new large engine that operates at a high load, and therefore design freedom can be improved even more.

Embodiment 6

FIG. 20 is a vertical cross-section of the tensioner of Embodiment 6 of the present invention, FIG. 21(a) is a side view of the locking piece of Embodiment 6, FIG. 21(b) is a plane view of the locking piece, and FIG. 21(c) is a left-side view of the locking piece. FIG. 22(a) is a side view of the shaft 3 of Embodiment 6, FIG. 22(b) is a plane view of the shaft 3, and FIG. 22(c) is a left-side view of the shaft 3.

The constitution of this embodiment is similar to that of the variation of FIG. 15, except that the structure of the ratchet mechanism that includes the locking piece 2, the inclined cam face 3c of the shaft 3, and the pressing spring 5, which presses the locking piece 2 in the direction that enlarges the diameter of the locking piece, differs from that of the variation of FIG. 15, and the constitution and the shape of the locking-piece-supporter at the rear end of the shaft 3 also partly differ from those of the variation of FIG. 15.

As shown in FIGS. 20 and 22, in this embodiment one locking-piece-accommodation groove 3m, which is open at the rear end of the locking-piece-accommodation groove 3m in the axial direction and which movably accommodates the below-described locking piece 2, is bored on the outside rear end of the shaft 3. A spring accommodation hole 3n for accommodating the below-described pressing spring 5 is bored on the bottom near the rear end of the locking-piece-accommodation groove 3m in a direction perpendicular to the shaft 3, i.e., in the radial direction. Furthermore, shaft mounting holes 3p for mounting the supporting shaft 22, which pivots the locking piece 2, are bored on both sides of the locking-piece-accommodation groove 3m near the front end of the locking-piece-accommodation groove 3m.

As shown in FIGS. 20 and 21, in the locking piece 2 in this embodiment, unlike the structure wherein the locking piece 2 can move in the axial direction via the inclined cam faces 2b, 3c of the locking pieces 2 and the shaft 3 of Embodiments 1 to 5, the locking teeth 2a are formed on the rear half of the outside of the locking piece 2, and an inclined face 2g that has a sloping gradient is formed on the front part of the locking piece 2 so that the diameter of the front half of the locking piece 2 is gradually reduced. Also, the inner periphery 2h (bottom end in the drawings) is formed into an approximately horizontal face, and the front end is formed into a forward-inclined face 2i (as illustrated), and both side faces are formed into split-nut shapes having a parallel-cut face 2d. The inclined face 2g at the rear half of the outside of the locking piece 2 and the inclined face 2i on the front-end face of the locking piece 2 serve as relief parts that prevent interference of the locking teeth 1b on the inner surface of the tubular member 1 and the front-end wall that is approximately axially perpendicular to the locking-piece-accommodation groove 3m when the locking piece 2 swings in the direction that reduces the diameter of the locking piece 2. Furthermore, the axial hole 2f, into which the supporting shaft 22 is inserted and which is rotatably pivoted, is located at the corner between the sides, i.e., within the inner periphery 2h of the parallel-cut face 2 and the front-end face 2i. The effect obtained by arranging the shaft holes 2f of the locking piece 2 at the corner between the inner periphery 2h and the front end face 2i will be described below.

Also, the pressing spring 5, which is a small-diameter compression spring, is accommodated in the spring accommodation hole 3n at the rear end of the shaft 3, and the rear end of the inner periphery 2h of the locking piece 2 is pressed in the direction that enlarges the diameter of the locking piece 2.

Accordingly, in this embodiment, unlike the locking-piece receiver that receives the locking piece 2 movably in the axial direction via the inclined cam face 2b (which has the inclined cam face 3c) of the shaft 3, the supporting shaft 22, which swingably supports the locking-piece-accommodation groove 3 in the radial direction at the rear end of the shaft 3 and the locking piece 2 in the locking-piece-accommodation groove 3, serves as the locking-piece-supporter that swingably pivots the locking piece 2.

In this embodiment, the locking piece 2, which are swingably pivoted in the radial direction in the locking-piece-accommodation groove, do not move in the axial direction, and therefore the holding plate 9 that is in the variation of FIG. 15 is omitted. Therefore the tensioner is a simple tensioner having a simplified constitution that is suitable for use with a small engine that operates at a light load.

This embodiment, having the above-mentioned constitution, can have actions and effects similar to those of the variation of FIG. 15.

Due to the ratchet mechanism, when the shaft 3 moves forward, the locking piece 2 receives a reaction force backwards in the axial direction at the locking teeth 1b, 2a of the tubular member 1, whereby rotation torque in the illustrated counterclockwise direction around the supporting shaft 22 is generated, and therefore the locking piece 2 rotates (swings) in the direction that reduces the diameter of the locking piece 2 against the biasing force of the pressing spring 5 onto the locking teeth 1b on the inner surface of the tubular member 1, and the locking teeth 2a can climb over the locking teeth 1b of the tubular member so as to move forward. Therefore the shaft 3 can move forward. When the shaft 3 moves backward, the locking piece 2 receives the forward reaction force in the axial direction at the locking teeth 1b, 2a, whereby rotation torque in the illustrated clockwise direction around the supporting shaft 22 is generated and is applied to the locking piece 2 in addition to the biasing force of the pressing spring 5, and therefore the locking piece 2 is pressed against the locking teeth 1b on the inner surface of the tubular member 1 so that they rotate (swing) in the direction that enlarges the diameter of the locking piece 2. Accordingly, the locking teeth 2a of the locking piece 2 are engaged with the locking teeth 1b of the tubular member 1, and thereby backward movement of the shaft 3 is prevented. Actions similar to those of Embodiments 1 and 2 can be performed corresponding to a proper load condition when a small engine is operated normally and corresponding to a light load condition when a small engine is operated at a temperature colder than normal.

Also, in Embodiment 6, only one locking piece 2 is provided on a single side relative to the center shaft of the shaft 3. However, multiple locking pieces 2 can be arranged symmetrically relative to the center shaft appropriately corresponding to the magnitude of the load from the engine.

In the present invention, combinations other than those of the embodiments described and shown in FIGS. 1 to 22 can be freely set, and the shapes of the tubular member 1, the locking pieces 2, the shaft 3, the propelling spring 4, the pressing spring 5, the holder spring 6, the case 7, and other components can be changed as appropriate. Also, the combination of components can be changed so that there can be provided a tensioner that has (1) a simplified structure, (2) increased strength of the locking teeth, (3) reduced backlash, (4) a lower number of parts and reduced costs, and (5) a large degree of design freedom.

Also, the shape or dimensions, including the diameter, of the compression spring members, such as the propelling spring 4, the pressing spring 5, and the holder spring 6, can be changed as appropriate, and therefore the spring compression force can be adjusted as desired. Furthermore, a coil spring, a leaf spring, a rubber molding, or a resin molding can be optionally applied for use as the compression springs.

BRIEF DESCRIPTIONS OF THE DRAWINGS

FIG. 12(a) shows an excessive load condition when the engine is operating at a higher temperature than normal, FIG. 12(b) shows a proper load condition when the engine is normally operated, and FIG. 12(c) shows a light load condition when the engine is operating at a colder temperature than normal.

Figure 1:
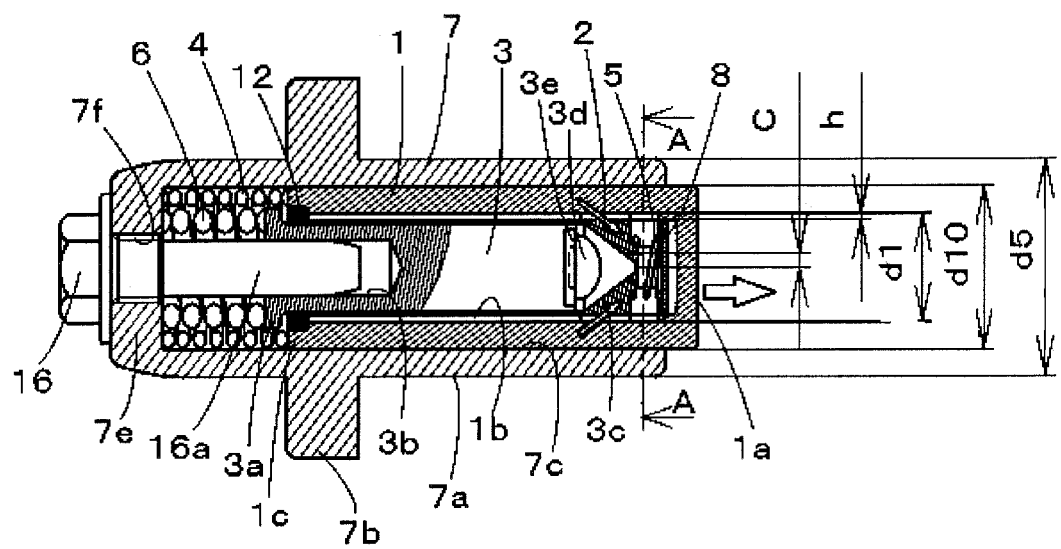
FIG. 1(a) is a vertical-cross-sectional view showing a tensioner of Embodiment 1.
FIG. 1(b) is a right-side view of that tensioner.
FIG. 1(c) is a cross-sectional view along the line A-A of FIG. 1(a).
Figure 1:
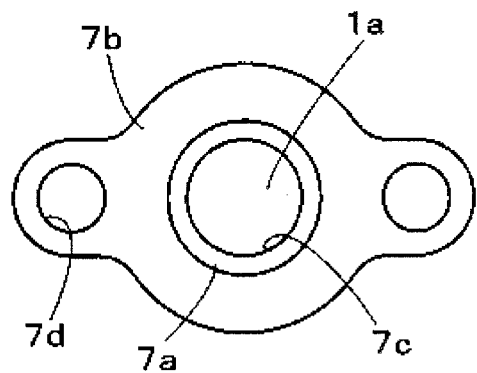
Figure 1:
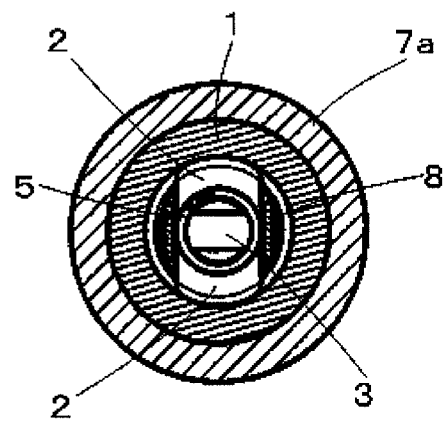
Figure 2:
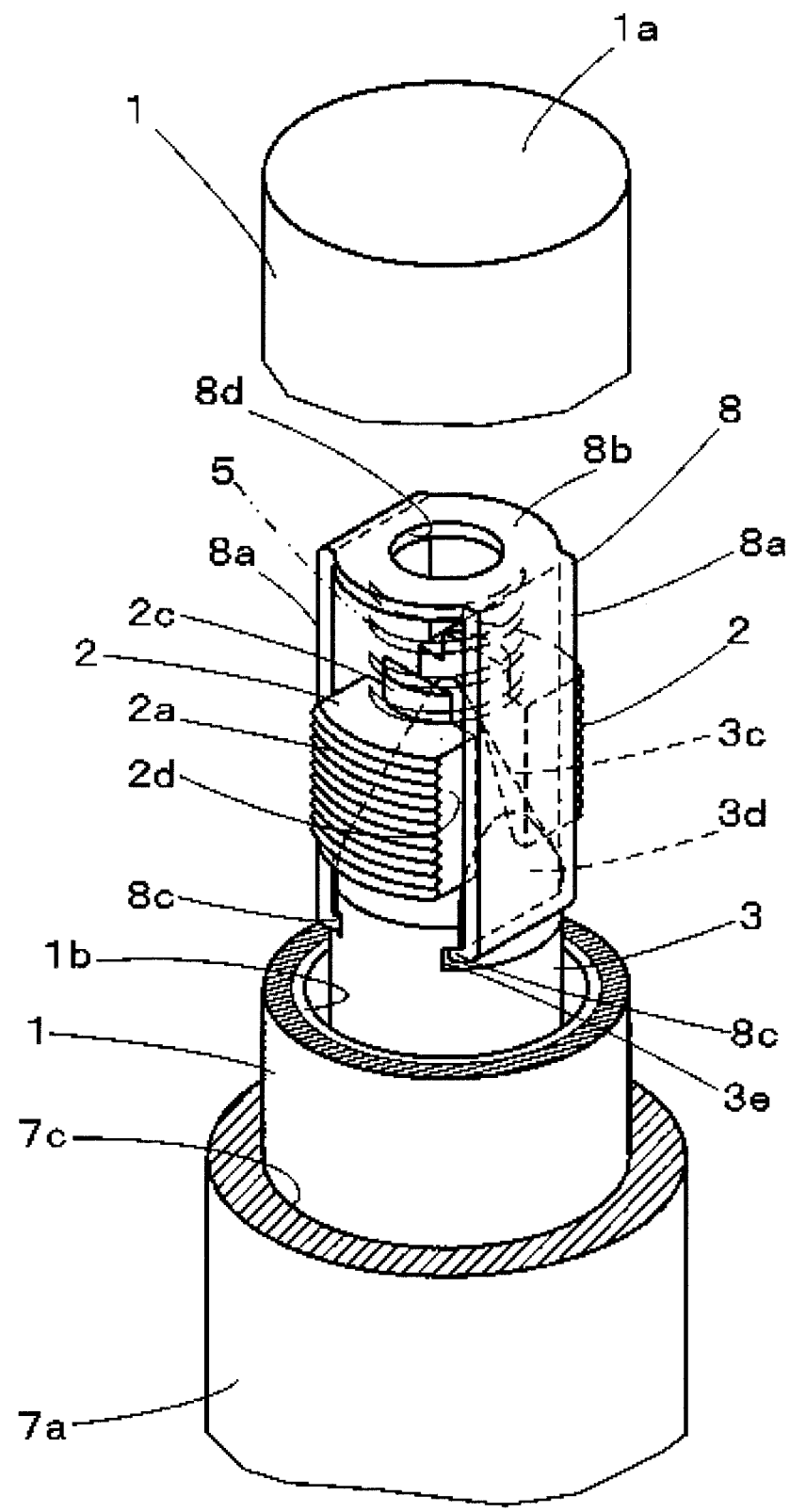
FIG. 2 is an exploded perspective view of a main part (ratchet mechanism part) located at the top of the tensioner of Embodiment 1.
Figure 3:
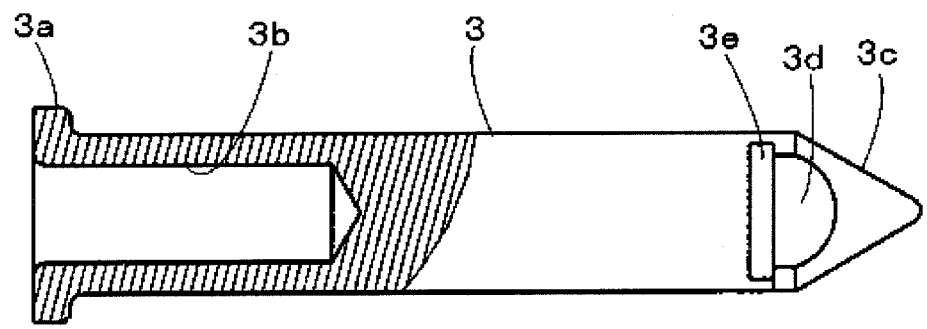
FIG. 3(a) is a side view (partial vertical-cross-sectional view) of the shaft of Embodiment 1.
FIGS. 3(b) and 3(c) are a plane view and a right-side view, respectively, of the shaft.
Figure 3:
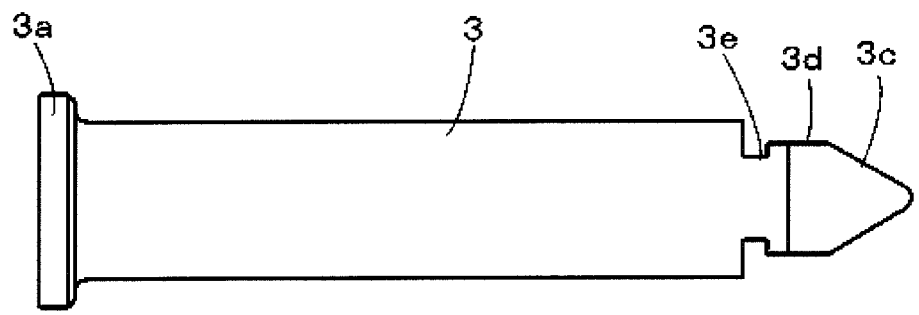
Figure 3:
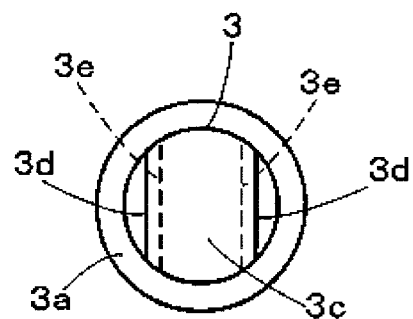
Figure 4:
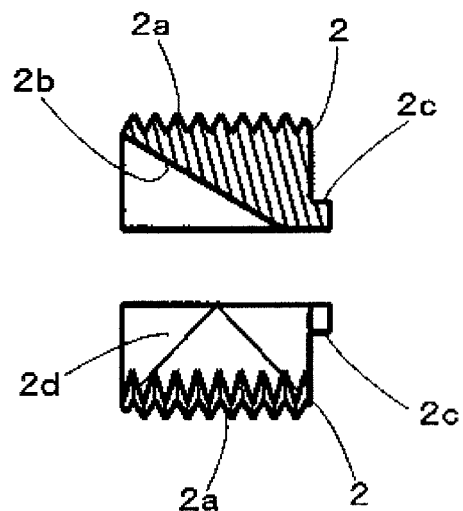
FIG. 4(a) is a side view (upper-half vertical-cross-sectional view) of the locking pieces of Embodiment 1.
FIGS. 4(b) and 4(c) are a left-side view and a right-side view, respectively, of the locking pieces.
Figure 4:
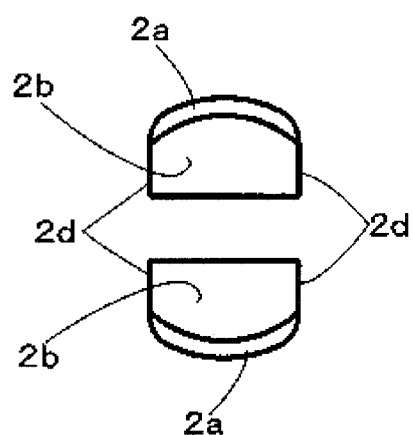
Figure 4:
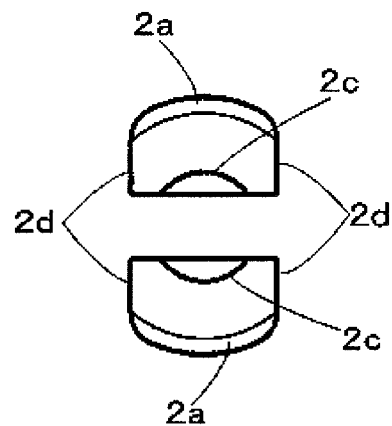
Figure 5:
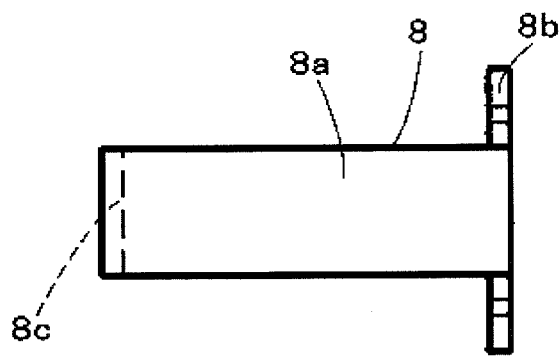
FIG. 5(a) is a side view of a anti-rotation plate of Embodiment 1.
FIGS. 5(b) and 5(c) are a plane view and a left view, respectively, of the anti-rotation plate.
Figure 5:
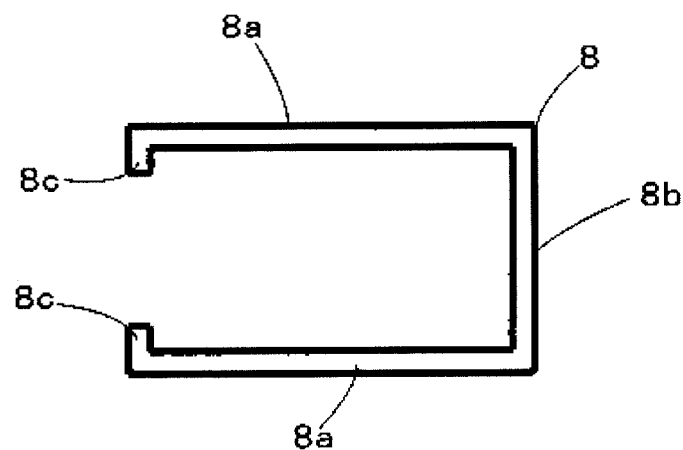
Figure 5:
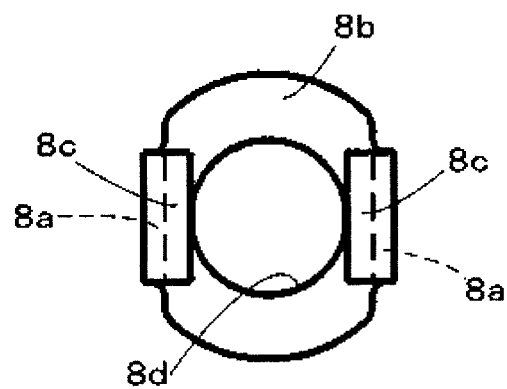
Figure 6:
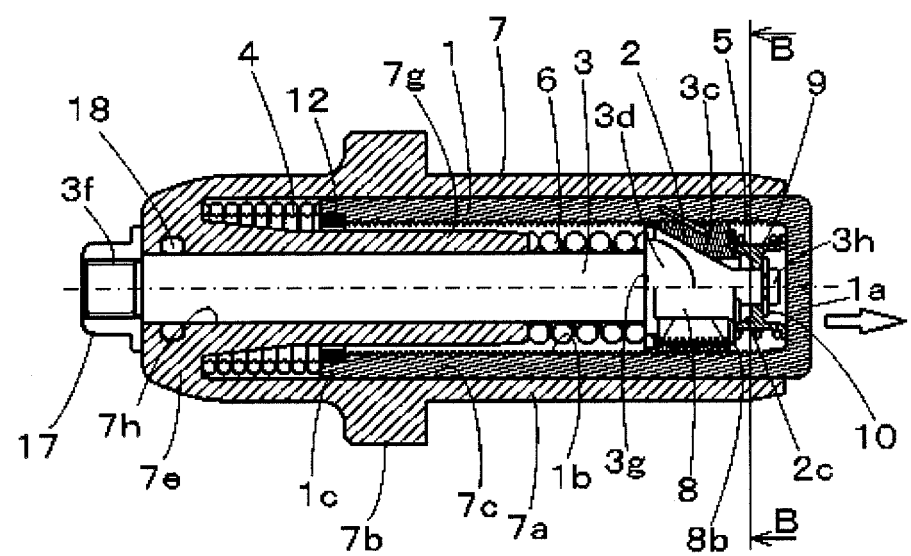
FIG. 6(a) is a vertical cross-sectional view of the tensioner of Embodiment 2 of the present invention.
FIG. 6(b) is a cross-sectional view along the line B-B of FIG. 6(a).
Figure 6:
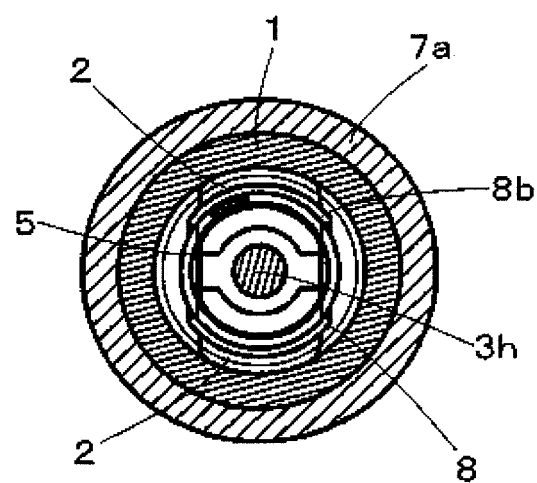
Figure 7:
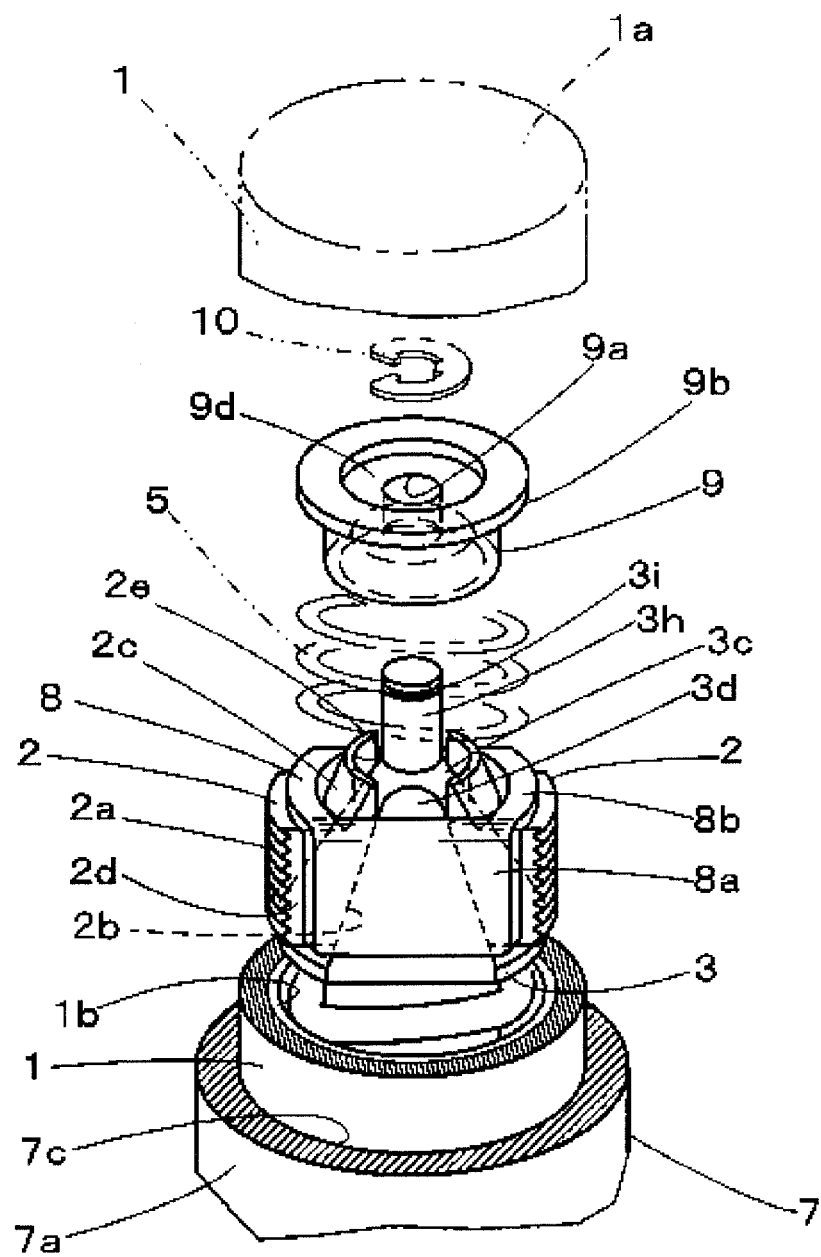
FIG. 7 is an exploded perspective view of a main part (ratchet mechanism part) at the top of the tensioner of Embodiment 2.
Figure 8:
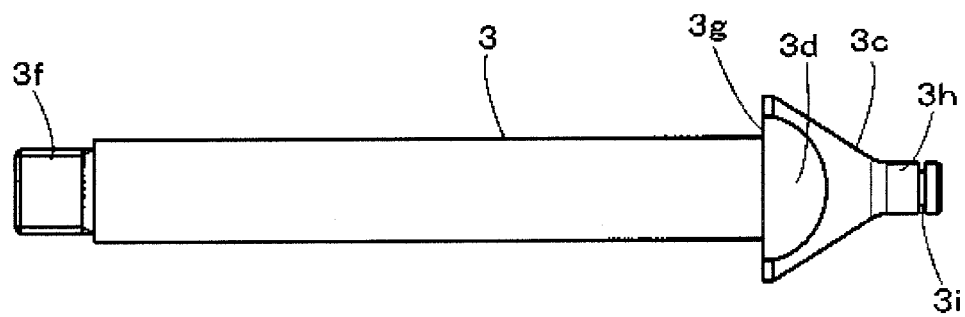
FIG. 8(a) is a side view of the shaft of Embodiment 2.
FIGS. 8(b) and 8(c) are a plane view and a right-side view, respectively, of the shaft.
Figure 8:
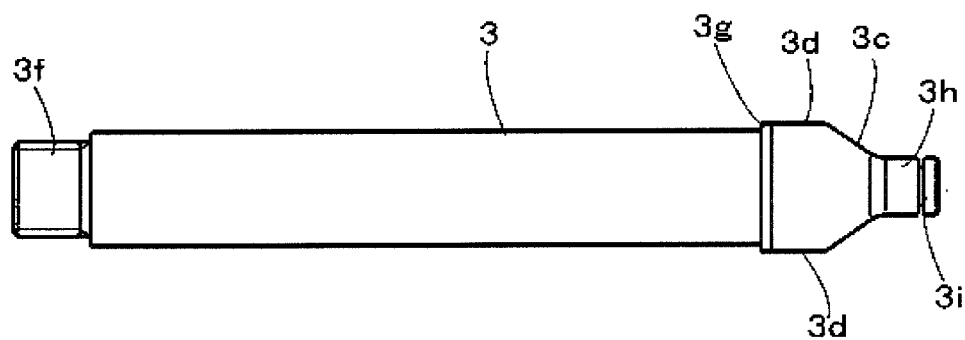
Figure 8:
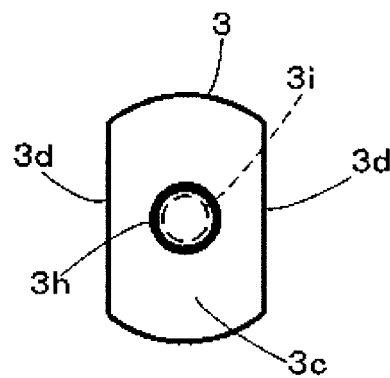
Figure 9:
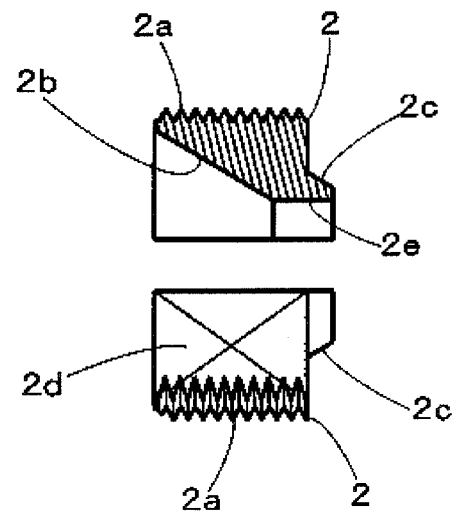
FIG. 9(a) is a side view of the locking pieces of Embodiment 2.
FIGS. 9(b) and 9(c) are a right-side view and a left-side view, respectively, of the locking pieces.
Figure 9:
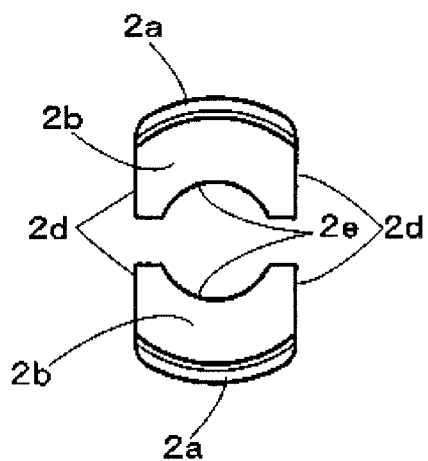
Figure 9:
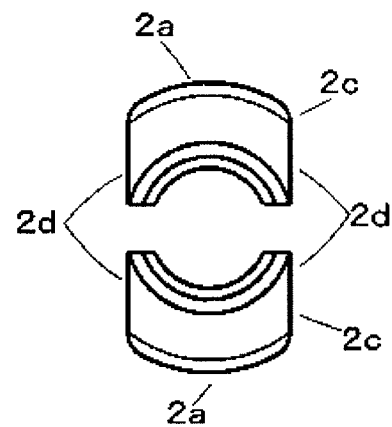
Figure 10:
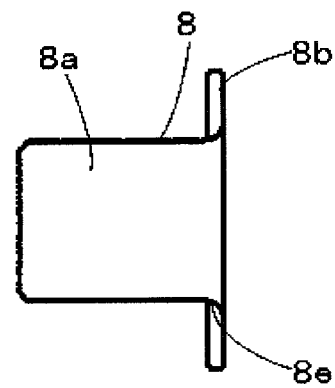
FIG. 10(a) is a side view of the anti-rotation plate of Embodiment 2.
FIGS. 10(b) and 10(c) are a plane view and a left-side view, respectively, of the anti-rotation plate.
Figure 10:
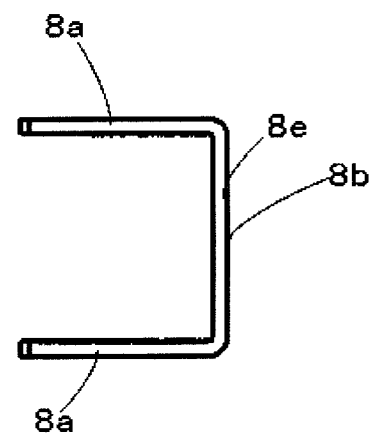
Figure 10:
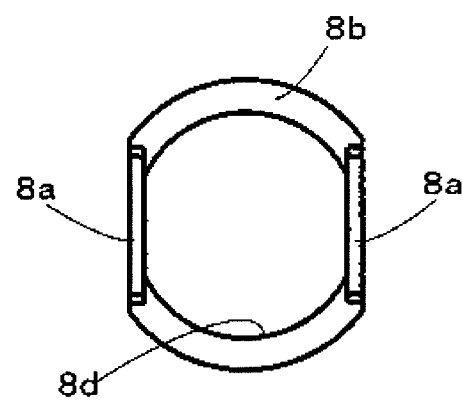
Figure 11:
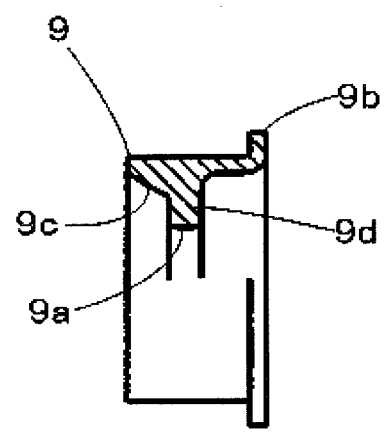
FIG. 11(a) is a side view of the holding plate of Embodiment 2.
FIG. 11(b) is a left-side view of that holding plate.
Figure 11:
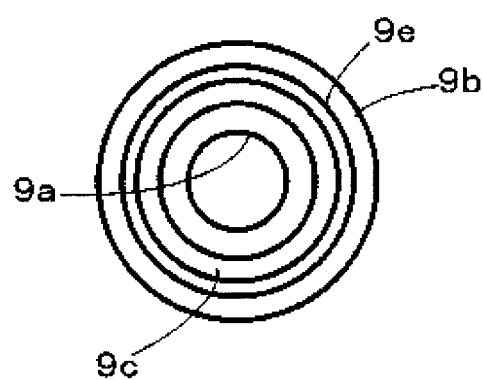
Figure 12:
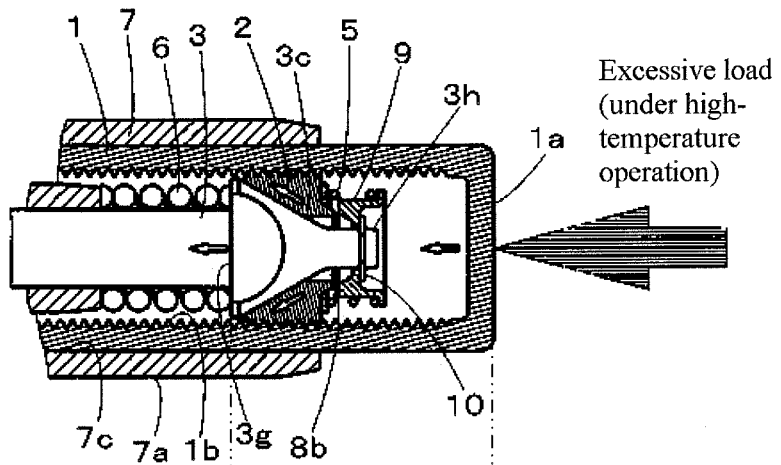
FIG. 12 shows the actions of the tensioner of Embodiment 2.
Figure 12:
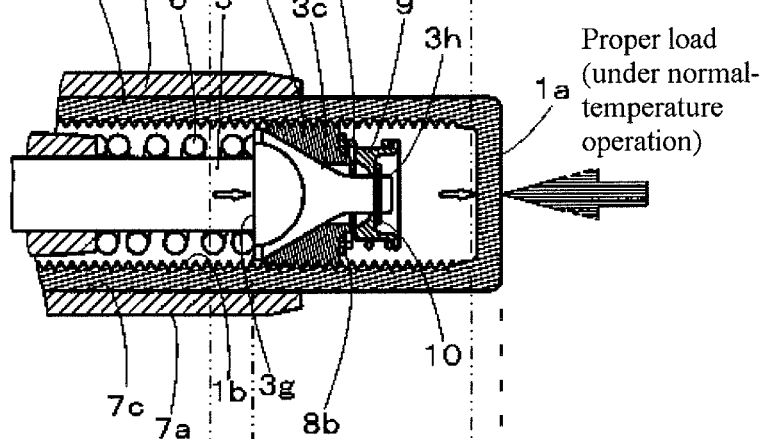
Figure 12:
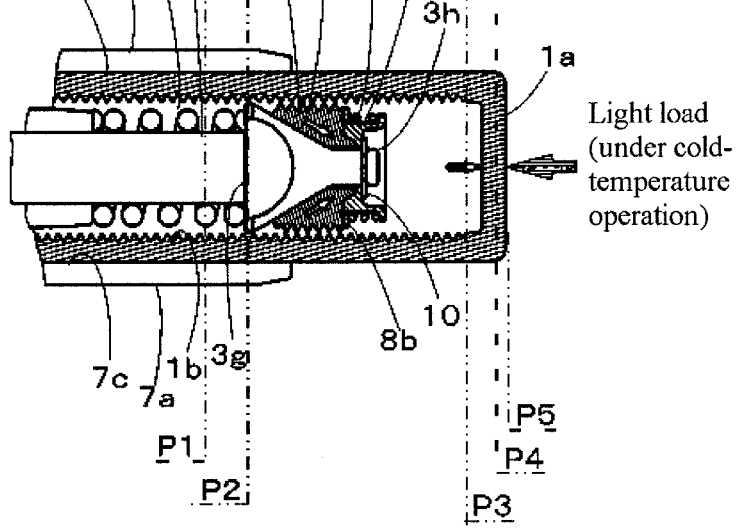
Figure 13:
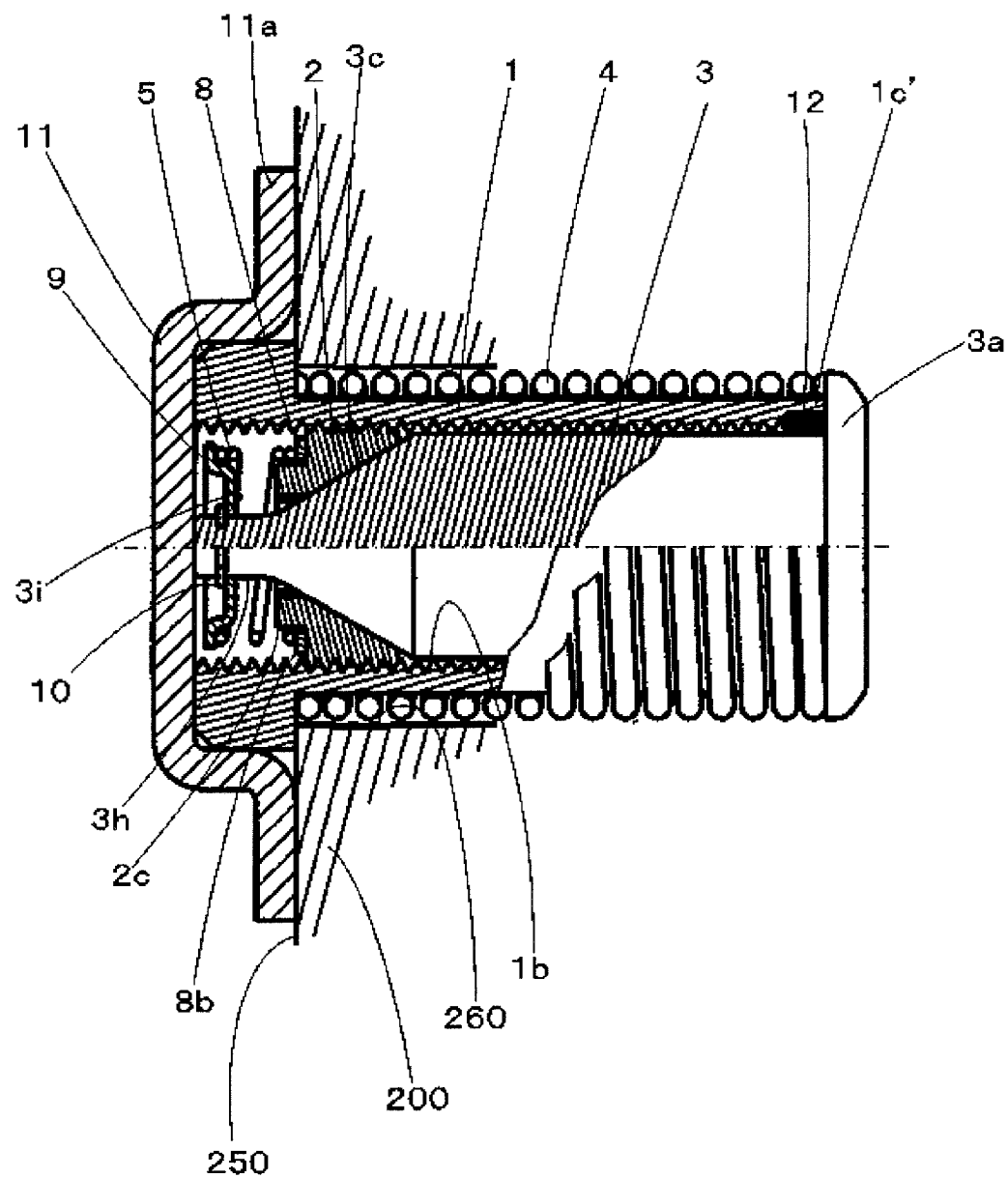
FIG. 13 is a vertical cross-sectional view of a tensioner of Embodiment 3 of the present invention.
Figure 14:
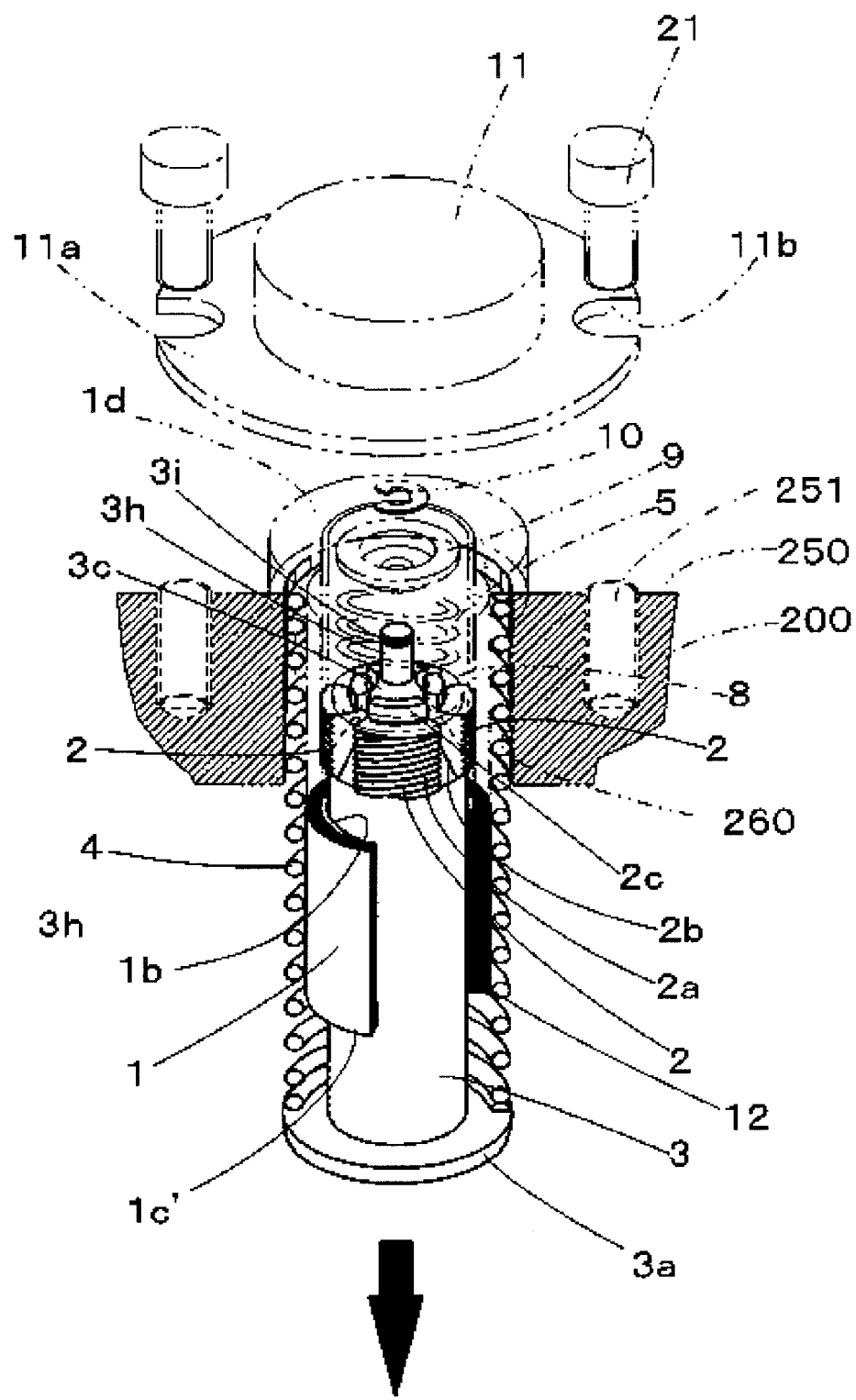
FIG. 14 is an exploded perspective view of a main part (ratchet mechanism part) at the top of the tensioner of Embodiment 3.
Figure 15:
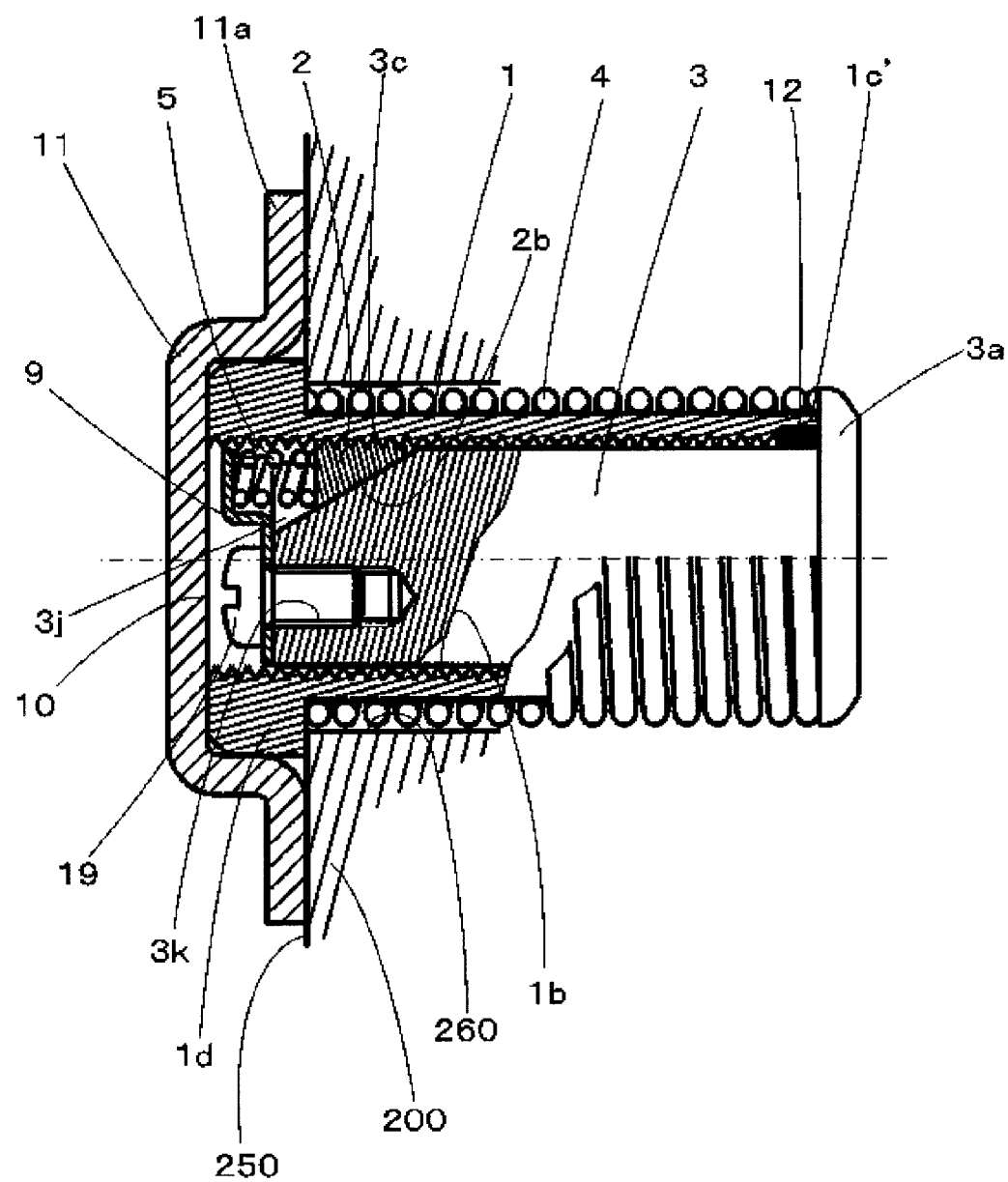
FIG. 15 is a vertical cross-sectional view of a tensioner in a variation of Embodiment 3.
Figure 16:
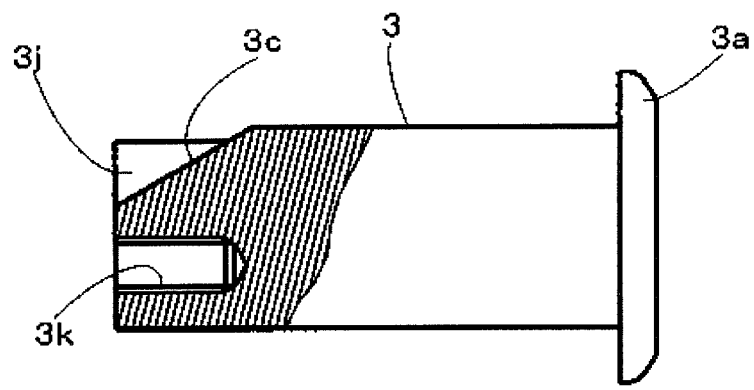
FIG. 16(a) is a side view (partial vertical-cross-sectional view) of the shaft of FIG. 15, and FIGS. 16(b) and 16(c) are a plane view and a left-side view, respectively, of the shaft.
Figure 16:
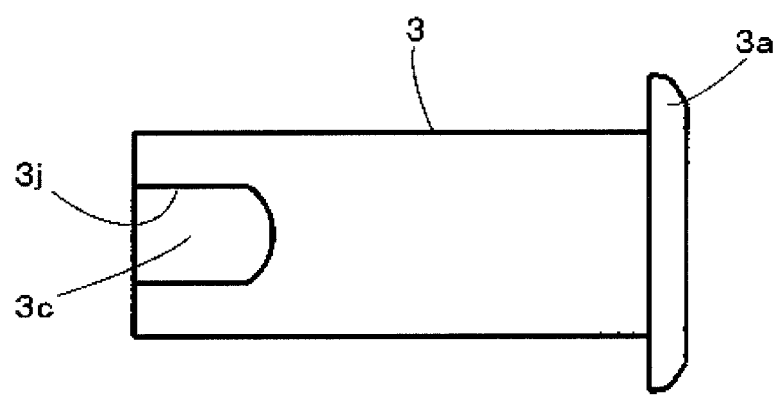
Figure 16:
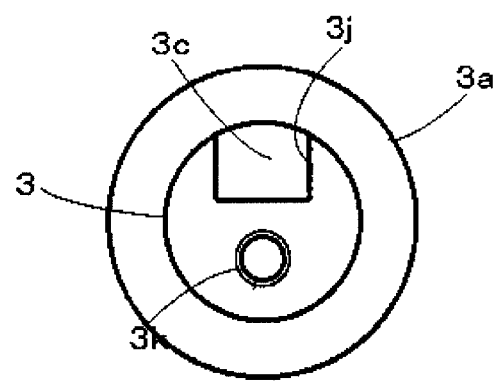
Figure 17:
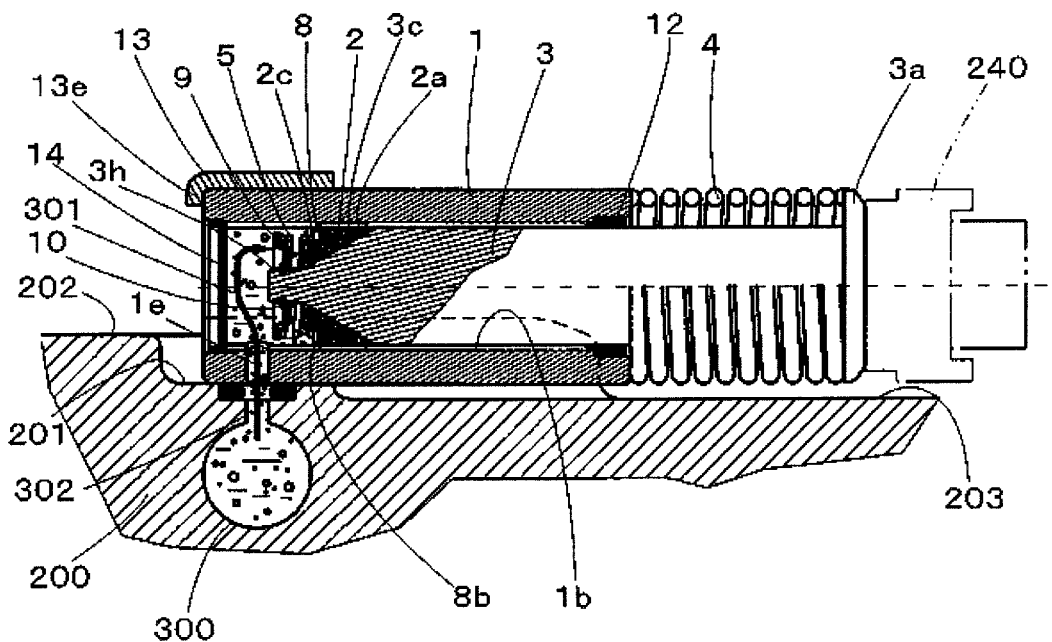
FIG. 17(a) is a side view (main part vertical-cross-sectional view) of a tensioner of Embodiment 4 of the present invention.
FIG. 17(b) is a plane view of the tensioner.
Figure 17:
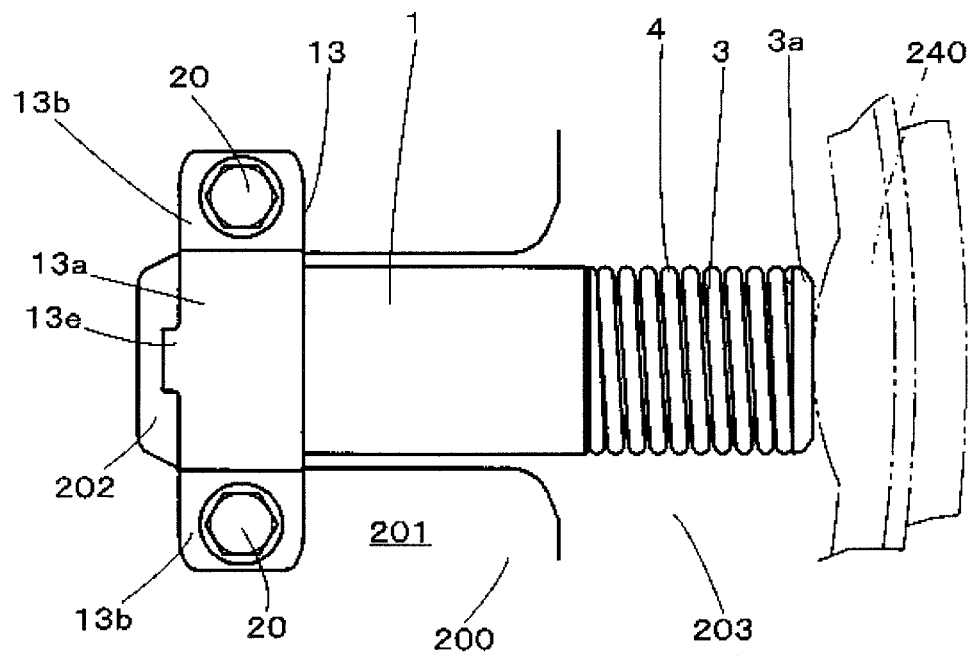
Figure 18:
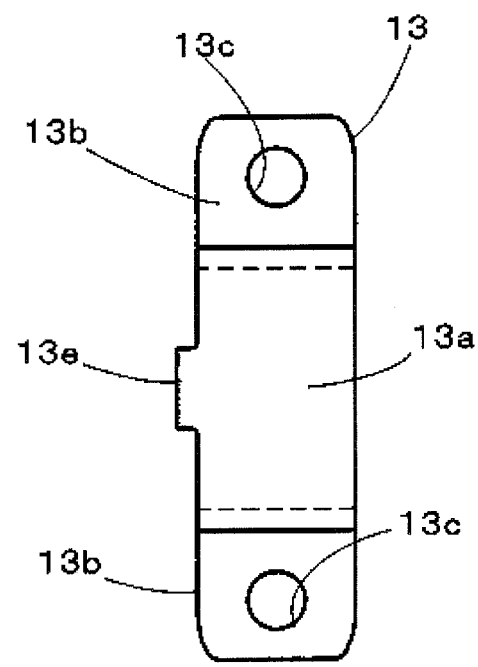
FIG. 18(a) is a plane view of the bracket of Embodiment 4.
FIG. 18(b) is a left-side view of the bracket
Figure 18:
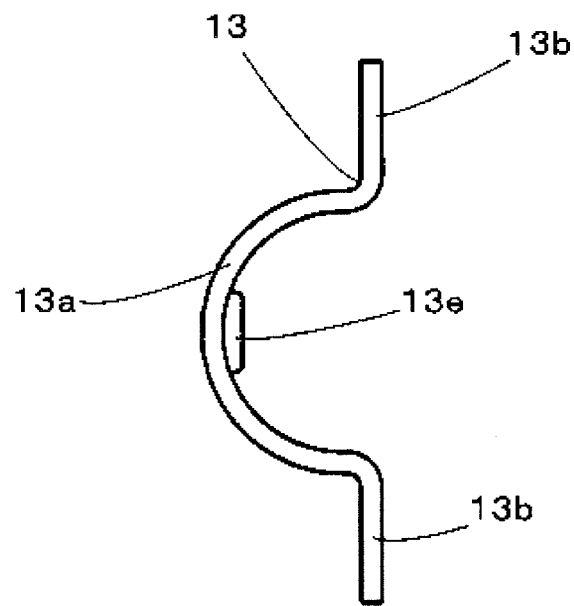
Figure 19:
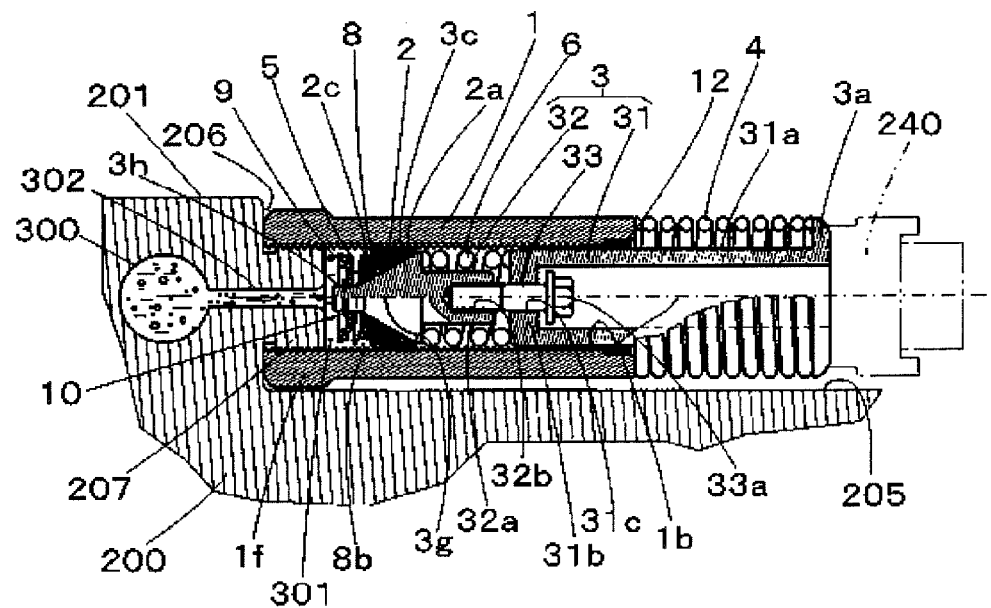
FIG. 19(a) is a side view (main part vertical-cross-sectional view) of a tensioner of Embodiment 5.
FIG. 19(b) is a plane view of the tensioner.
Figure 19:
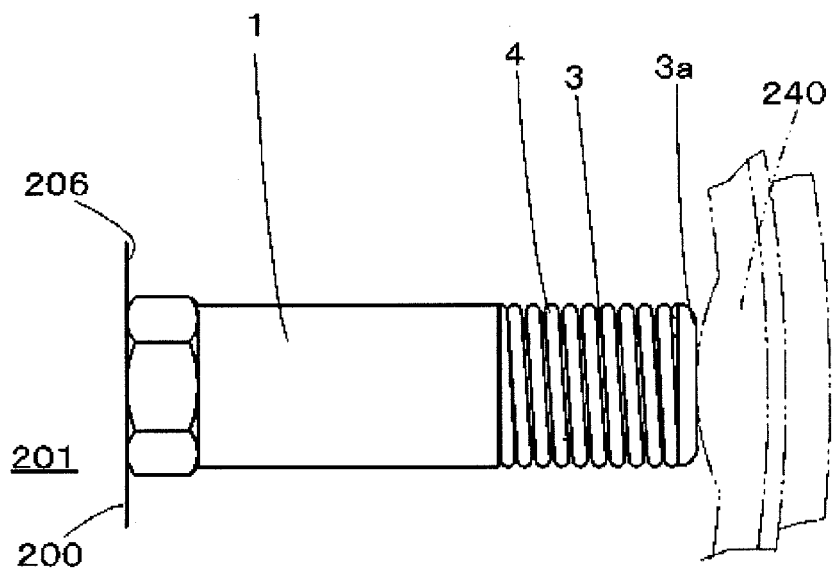
Figure 20:
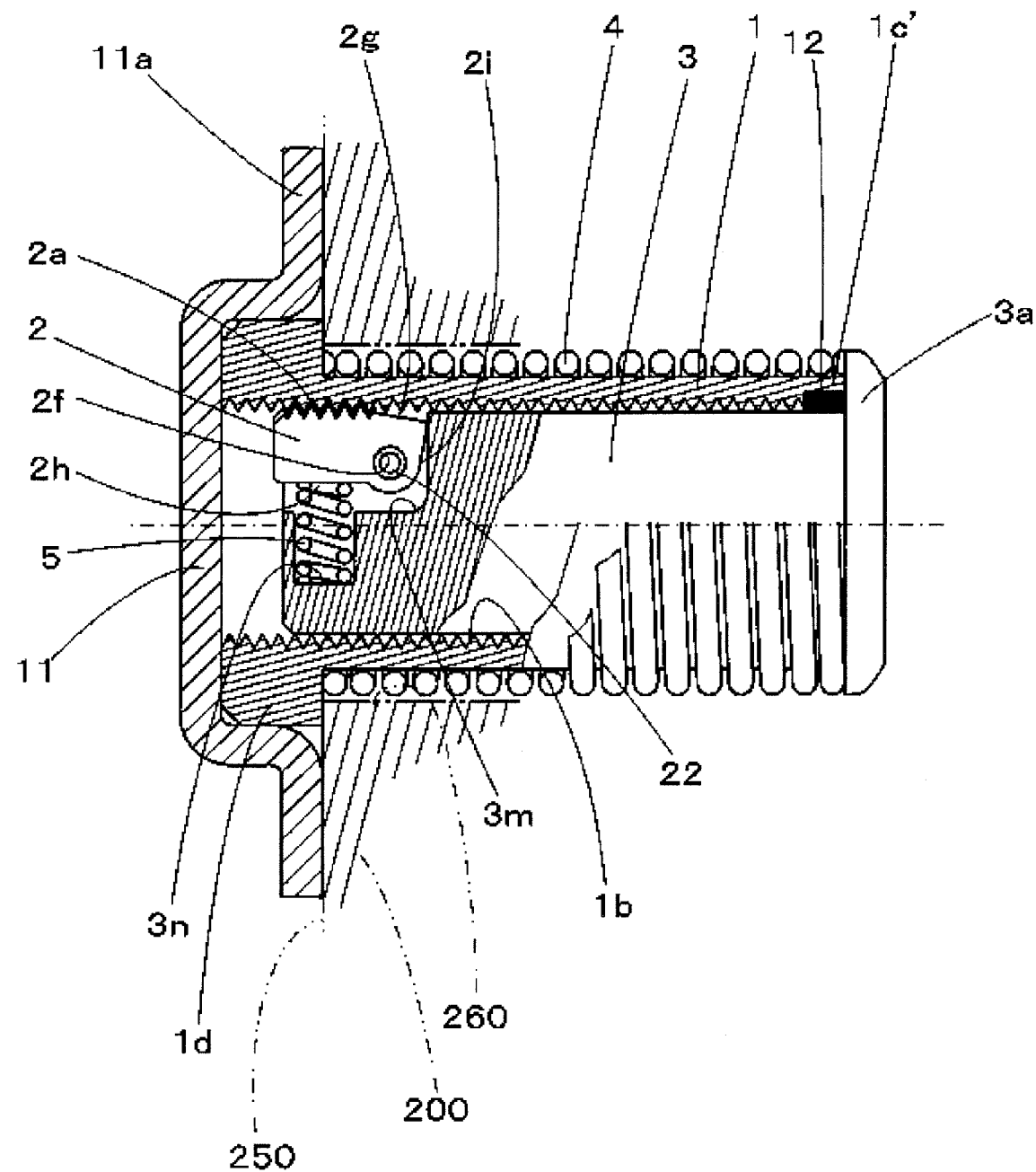
FIG. 20 is a vertical cross-section of a tensioner of Embodiment 6 of the present invention.
Figure 21:
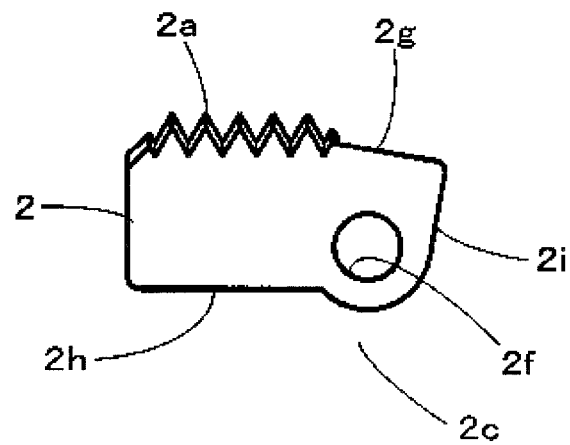
FIG. 21(a) is a side view of the locking pieces of Embodiment 6.
FIG. 21(b) is a plane view of the locking pieces.
FIG. 21(c) is a left-side view of the locking pieces.
Figure 21:
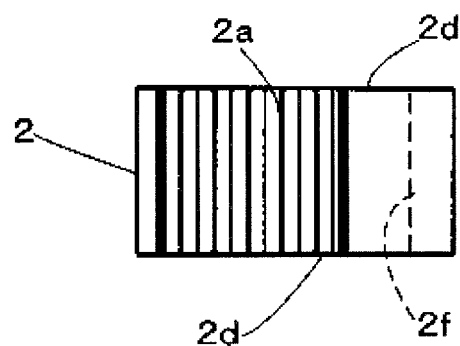
Figure 21:
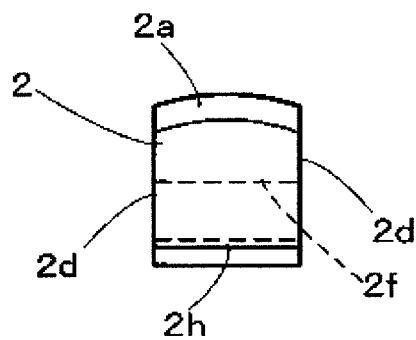
Figure 22:
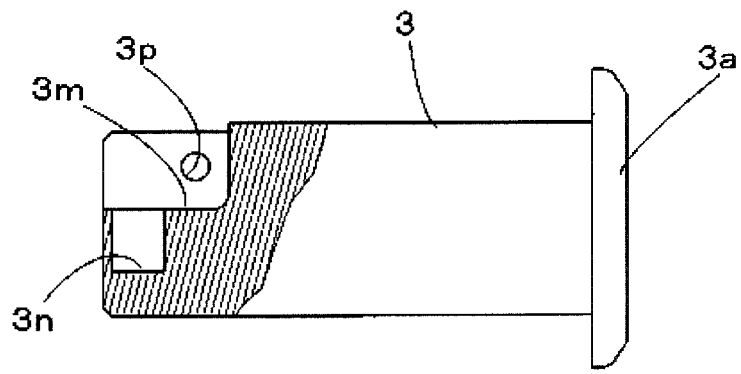
FIG. 22(a) is a side view of the shaft of Embodiment 6.
FIG. 22(b) is a plane view of the shaft.
FIG. 22(c) is a left-side view of the shaft.
Figure 22:
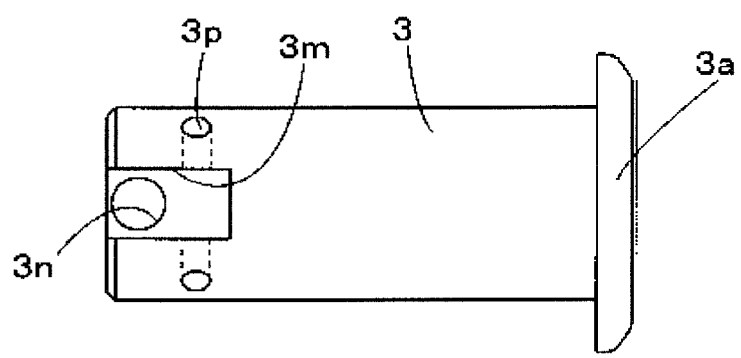
Figure 22:
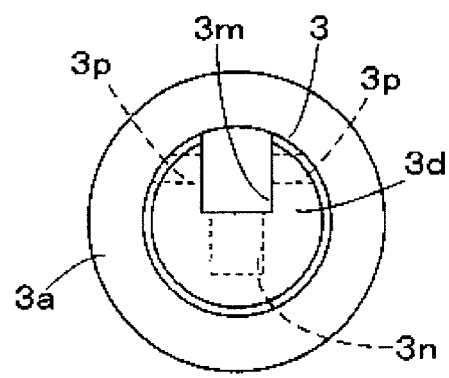
Figure 23:
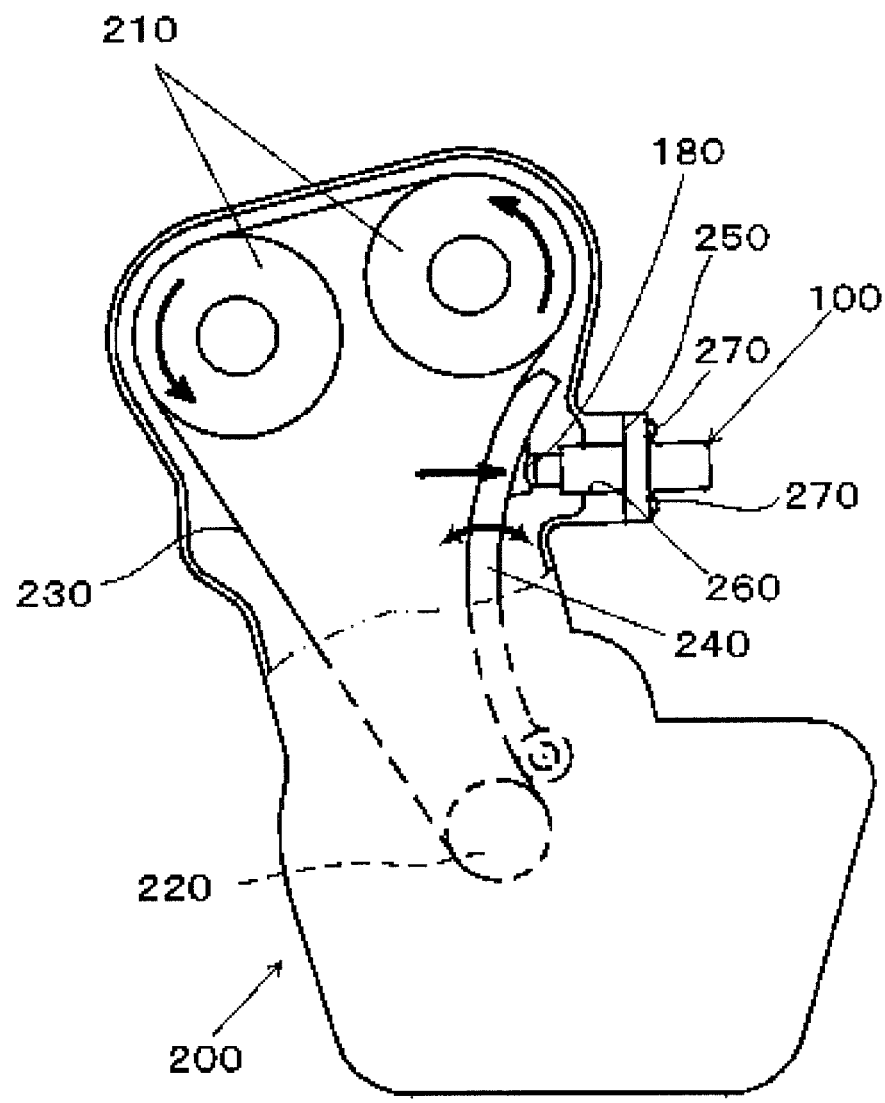
FIG. 23 shows one example of a layout in which the tensioner is mounted to an engine body.
Figure 24:
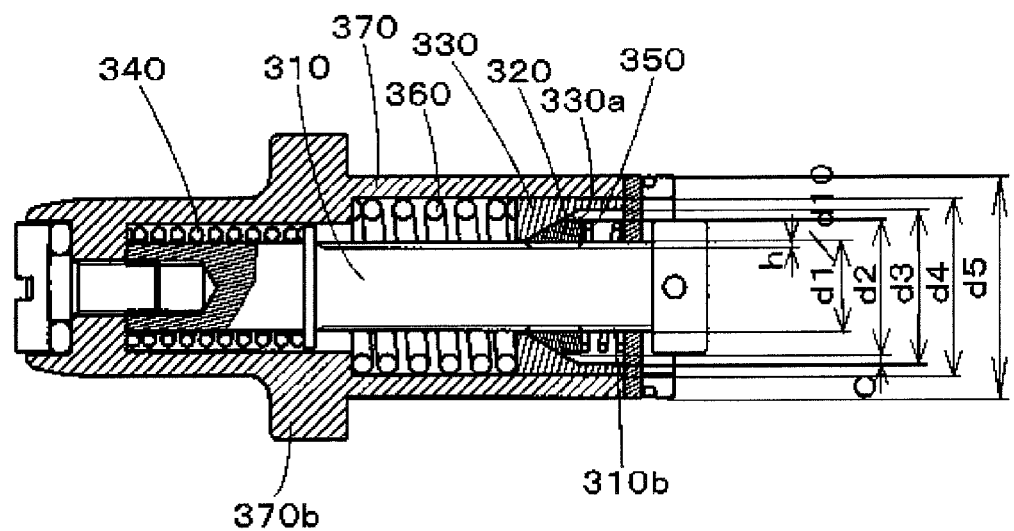
FIG. 24 is a vertical cross-sectional view of one example of a conventional tensioner.
Figure 24:
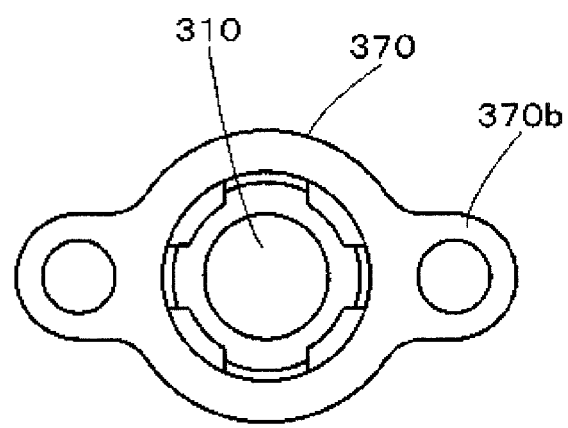

FIG. 25(a) explains how the drive member of the tensioner in FIG. 24 is fully locked with the locking pieces, and FIG. 25(b) is a cross-sectional view along the line D-D of FIG. 25(a).

Figure 25:
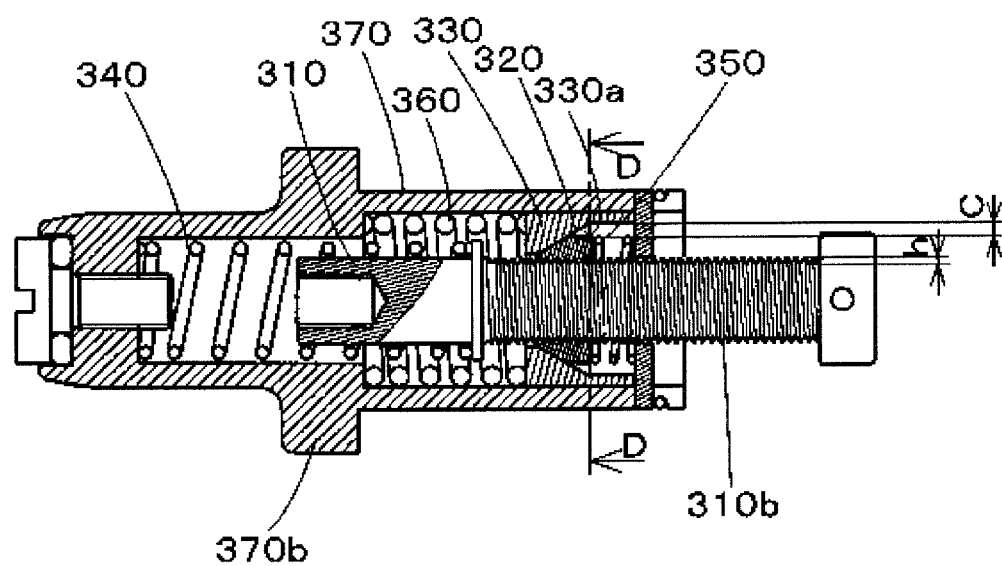
Figure 25:
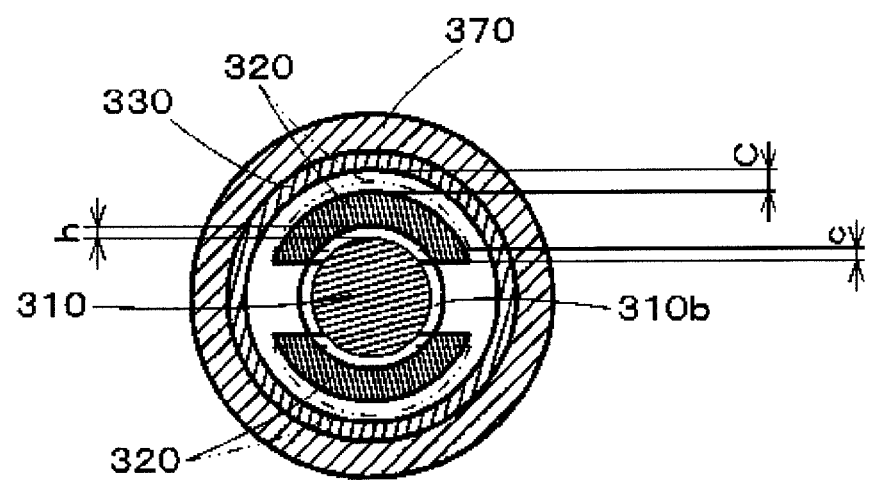
Figure 26:
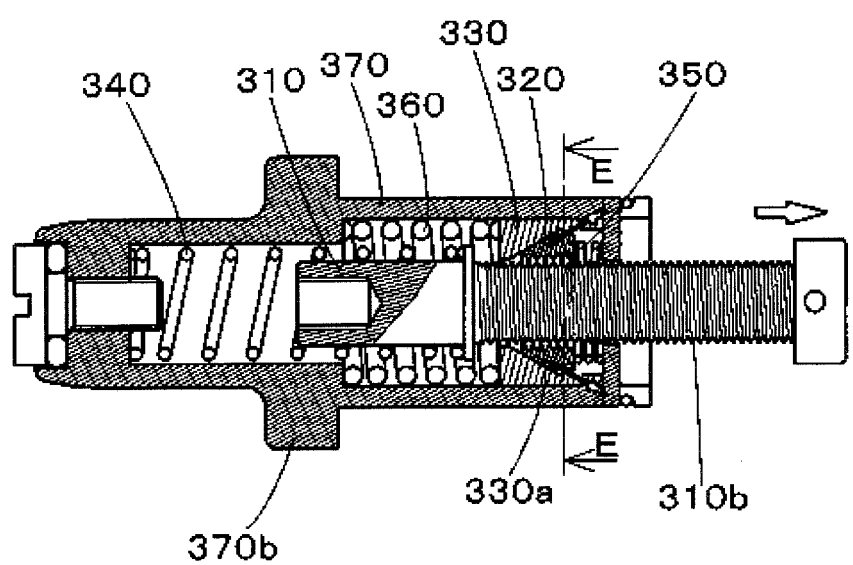
Figure 26:
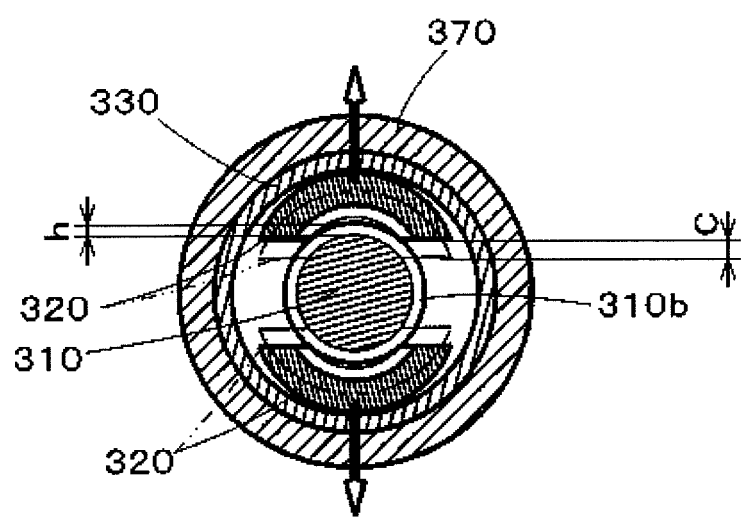

FIG. 26(a) explains how the diameter of the locking pieces is enlarged when the drive member of FIG. 25 moves forward, and FIG. 25(b) is a cross-sectional view along the line E-E of FIG. 26(a).

EXPLANATION OF NUMBERS USED 1 tubular member
1b, 2a locking teeth
2 locking piece
2b inclined cam face
3 shaft
3c inclined cam face (locking-piece receiver)
3m locking-piece-accommodation groove
3n spring accommodation hole
3p shaft mounting hole (locking-piece supporter)
4 propelling spring
5 pressing spring
6 holder spring
7 case
8 anti-rotation plate
8' washer
9 holding plate
22 supporting shaft
200 engine body
201 inner wall
207 male screw part

What is claimed is:

1. A tensioner comprising
a tubular member on which multiple locking teeth are formed on an inner surface thereof,
one or more locking pieces on an outer surface of which are formed locking teeth that engage with said tubular member's locking teeth; and
a shaft, which is inside the tubular member and has a locking-piece receiving part or a locking-piece supporting part for receiving the locking pieces that are engaged with the tubular member,
wherein either said tubular member or said shaft moves, as a moving member, reciprocally in relation to each other due to a biasing force,
wherein a ratchet mechanism is provided in which said locking pieces move in a direction in which a diameter of said locking pieces is reduced so as to climb over the locking teeth of said tubular member so that said moving member can move forward, and said locking pieces move in a direction in which the diameter of said locking pieces is enlarged, so as to engage with the locking teeth of said tubular member so that said moving member is restrained from moving backward, and
the locking-piece receiving part of said shaft is an inclined cam face that is (1) shaped so as to correspondingly fit slidably with an inclined cam face formed on the inner periphery of said locking pieces, and (2) formed so as to enlarge the diameter of said locking pieces in the direction in which said locking pieces engage with the locking teeth of said tubular member.

2. The tensioner according to claim 1, wherein said ratchet mechanism includes (1) said inclined cam face of said shaft, and (2) a pressing spring that presses said locking pieces towards said inclined cam face of the shaft and biases said locking pieces in the direction in which the diameter of said locking pieces is enlarged.

3. A tensioner according to claim 1, and wherein the ratchet mechanism comprises
- a locking-piece-accommodation groove that is formed on the locking-piece-supporter and that accommodates the locking pieces,
- a support shaft that swingably pivots, in the tensioner's radial direction, the locking pieces that are in the locking-piece-accommodation groove, and
- a pressing spring that presses the locking pieces in the direction that enlarges the diameter of the locking pieces.

4. The tensioner according to claim 1, wherein both the locking teeth of the tubular member and the locking pieces are spur teeth, being single-threaded or multi-threaded teeth having a lead of 0 and formed into a groove in the direction orthogonal to the axial direction of said tubular member.

5. The tensioner according to claim 1, wherein the outer face of the shaft is arranged on the inner face of the tubular member in such a way that the shaft and the tubular member are axially movable against each other in a radial gap.

6. A tensioner according to claim 1, and including a hydraulic source that applies hydraulic pressure in the driving direction of a drive member.

\* \* \* \* \*